United States Patent
Shigeta et al.

(10) Patent No.: US 10,637,381 B2
(45) Date of Patent: Apr. 28, 2020

(54) INVERTER CONTROL DEVICE AND DRIVE SYSTEM

(71) Applicants: KABUSHIKI KAISHA TOSHIBA, Minato-ku (JP); Toshiba Infrastructure Systems & Solutions Corporation, Kawasaki-shi (JP)

(72) Inventors: Tomoaki Shigeta, Fuchu (JP); Shun Taniguchi, Fuchu (JP); Kentaro Suzuki, Hachioji (JP); Kazuaki Yuuki, Tokorozawa (JP)

(73) Assignees: KABUSHIKI KAISHA TOSHIBA, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/281,373

(22) Filed: Feb. 21, 2019

(65) Prior Publication Data

US 2019/0190421 A1 Jun. 20, 2019

Related U.S. Application Data

(63) Continuation of application No. PCT/JP2017/029972, filed on Aug. 22, 2017.

(30) Foreign Application Priority Data

Aug. 22, 2016 (JP) .................................. 2016-162199

(51) Int. Cl.
  *H02P 21/22* (2016.01)
  *H02P 27/12* (2006.01)
  (Continued)

(52) U.S. Cl.
  CPC .............. *H02P 21/09* (2016.02); *H02M 7/48* (2013.01); *H02P 6/182* (2013.01); *H02P 21/22* (2016.02); *H02P 27/12* (2013.01); *H02P 2207/05* (2013.01)

(58) Field of Classification Search
  None
  See application file for complete search history.

(56) References Cited

U.S. PATENT DOCUMENTS

2002/0060548 A1 5/2002 Iwaji et al.
2004/0263114 A1 12/2004 Kaneko et al.
(Continued)

FOREIGN PATENT DOCUMENTS

JP 2002-204595 7/2002
JP 3722948 B2 11/2005
(Continued)

OTHER PUBLICATIONS

International Search Report dated Nov. 7, 2017 in PCT/JP2017/029972 filed Aug. 22, 2017 (with English Translation).

(Continued)

*Primary Examiner* — Bentsu Ro
(74) *Attorney, Agent, or Firm* — Oblon, McClelland, Maier & Neustadt, L.L.P.

(57) ABSTRACT

A device according to an embodiment including a command generator that generates a current command value; a detector that detects a current value to be outputted from an inverter to an motor; a generator that generates a gate command to the inverter, and obtains an output voltage target vector of the inverter based on the gate command; an estimator that obtains a rotary phase angle estimated value of the motor based on the detected current value and the output voltage target vector; and a polarity determination part that, with supply of a current in synchronism with a rotor frequency of (Continued)

the motor, performs determination of a magnet magnetic pole using a generated magnetic flux or voltage in synchronism with the generated rotor frequency or both of them, and outputs a correction value for the rotary phase angle estimated value based on a result of the determination.

11 Claims, 18 Drawing Sheets

(51) Int. Cl.
*H02P 21/09* (2016.01)
*H02P 6/182* (2016.01)
*H02M 7/48* (2007.01)

(56) References Cited

U.S. PATENT DOCUMENTS

| | | | |
|---|---|---|---|
| 2008/0048599 A1 | 2/2008 | Ho | |
| 2009/0261774 A1* | 10/2009 | Yuuki | H02K 1/2766 318/720 |
| 2010/0045218 A1 | 2/2010 | Tomigashi | |
| 2011/0234135 A1 | 9/2011 | Kato et al. | |
| 2011/0285337 A1* | 11/2011 | Taniguchi | H02P 6/20 318/400.34 |
| 2012/0235609 A1 | 9/2012 | Ide et al. | |
| 2013/0049656 A1* | 2/2013 | Yasui | H02P 21/00 318/400.02 |
| 2013/0249460 A1* | 9/2013 | Sugahara | H02M 7/797 318/472 |
| 2014/0009147 A1 | 1/2014 | Taniguchi et al. | |
| 2016/0111951 A1 | 4/2016 | Taniguchi et al. | |

FOREIGN PATENT DOCUMENTS

| | | |
|---|---|---|
| JP | 4241218 B2 | 3/2009 |
| JP | 2010-22185 | 1/2010 |
| JP | 2011-205832 | 10/2011 |
| JP | 2011-217575 | 10/2011 |
| JP | 5534935 B2 | 7/2014 |
| WO | WO 2014/192373 A1 | 12/2014 |
| WO | WO 2016/121751 A1 | 8/2016 |

OTHER PUBLICATIONS

Written Opinion dated Nov. 7, 2017 in PCT/JP2017/029972 filed Aug. 22, 2017.
Search Report and Written Opinion dated Dec. 12, 2019 in Singaporean Application No. 11201901395W citing references AA-AC therin, 7 pages.
Extended European Search Report dated Mar. 4, 2020 in European Application No. 17843589.7, filed Aug. 22, 2017.

* cited by examiner

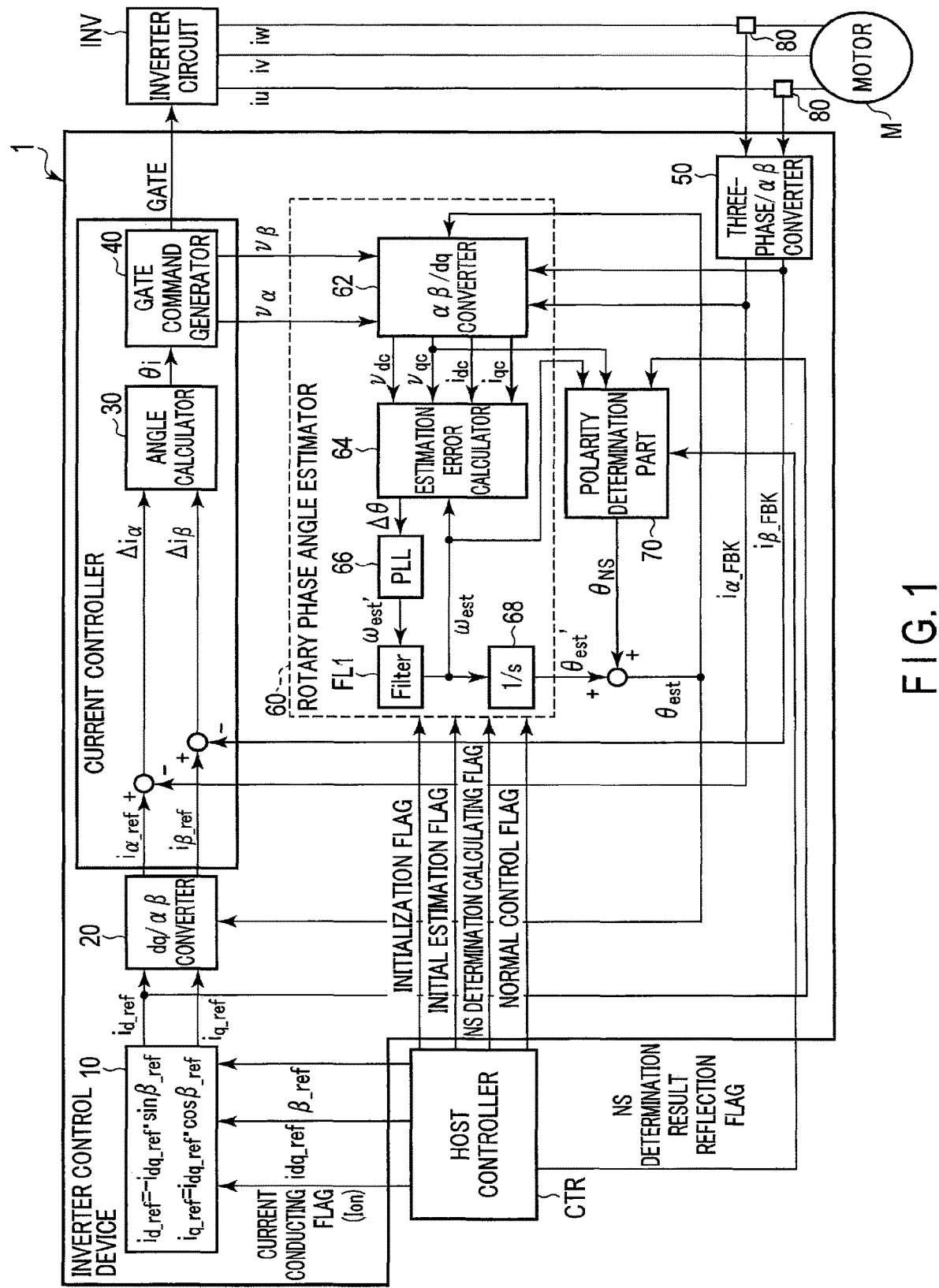
F I G. 1

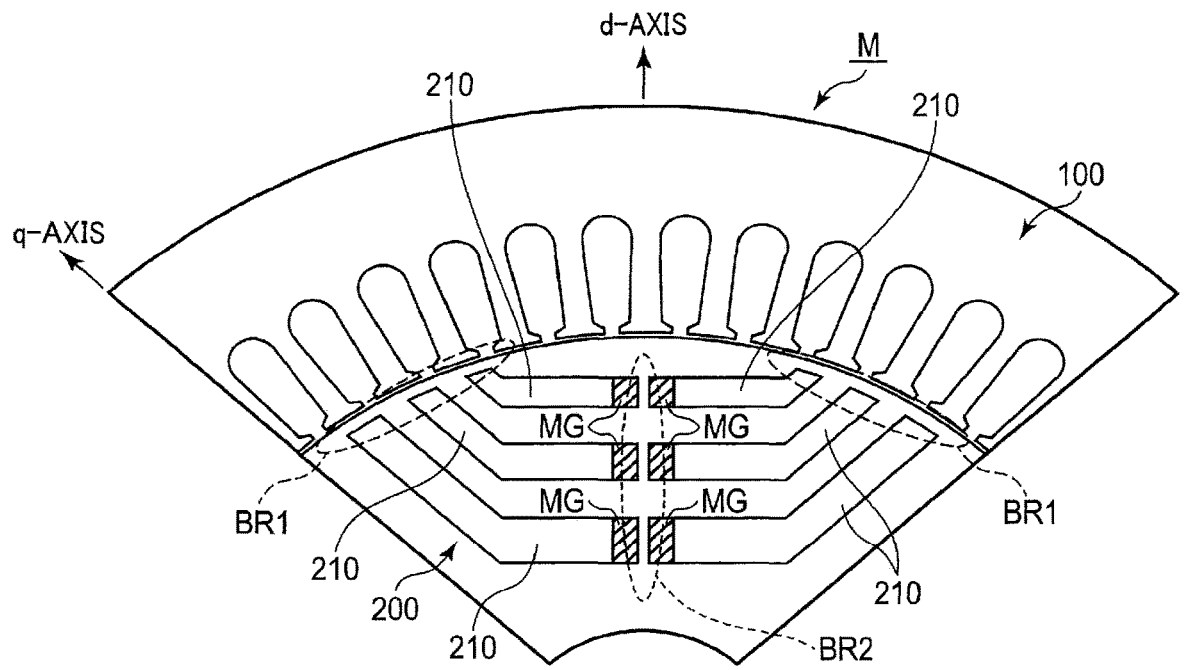
F I G. 4
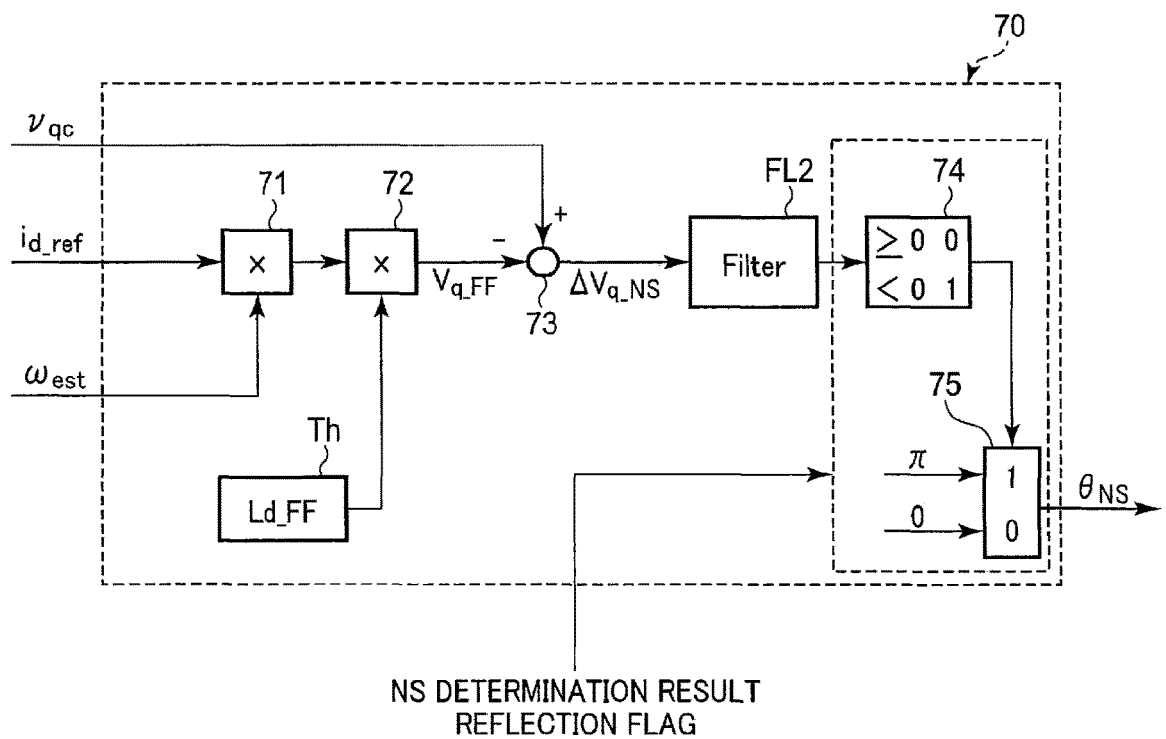
NS DETERMINATION RESULT
REFLECTION FLAG
F I G. 5

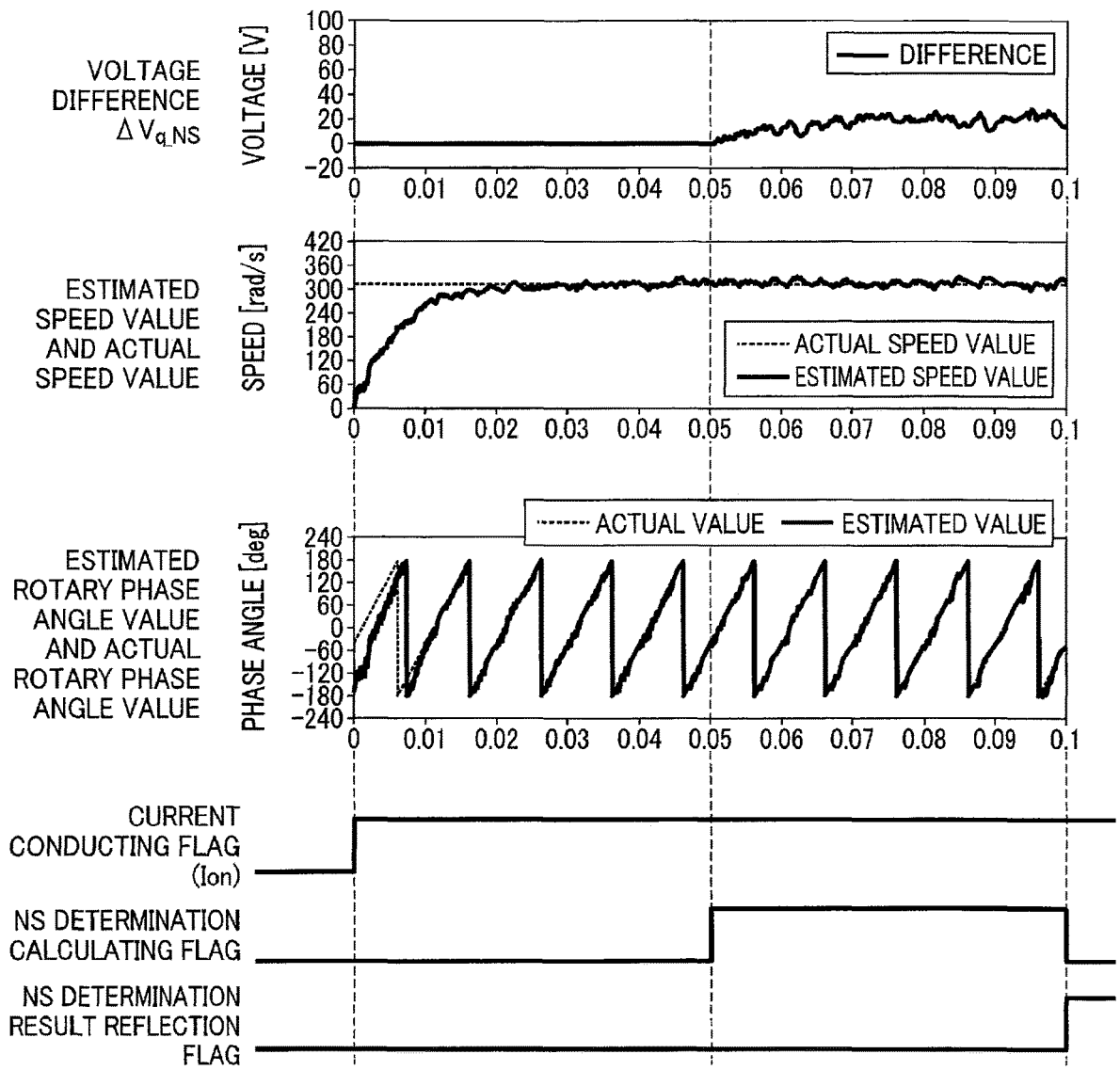
F I G. 10

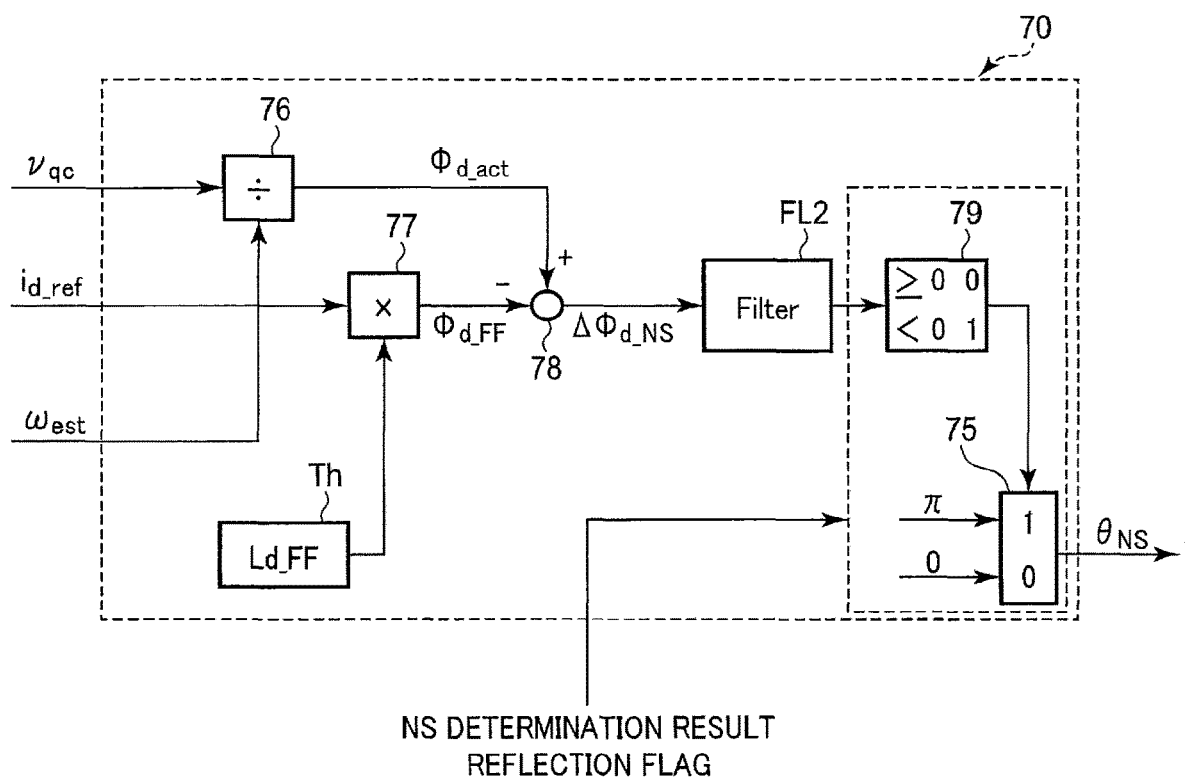
F I G. 11

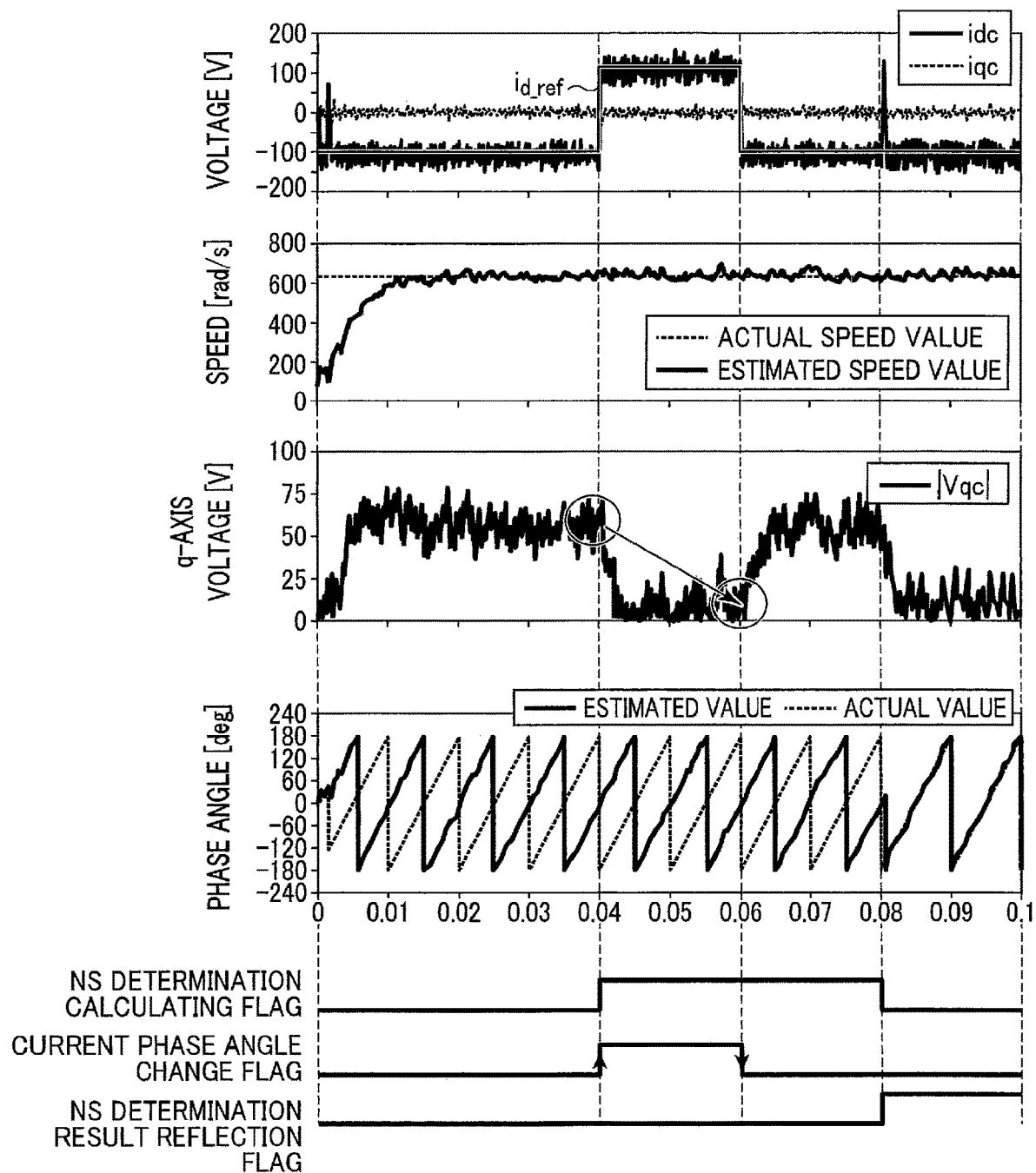
F I G. 17

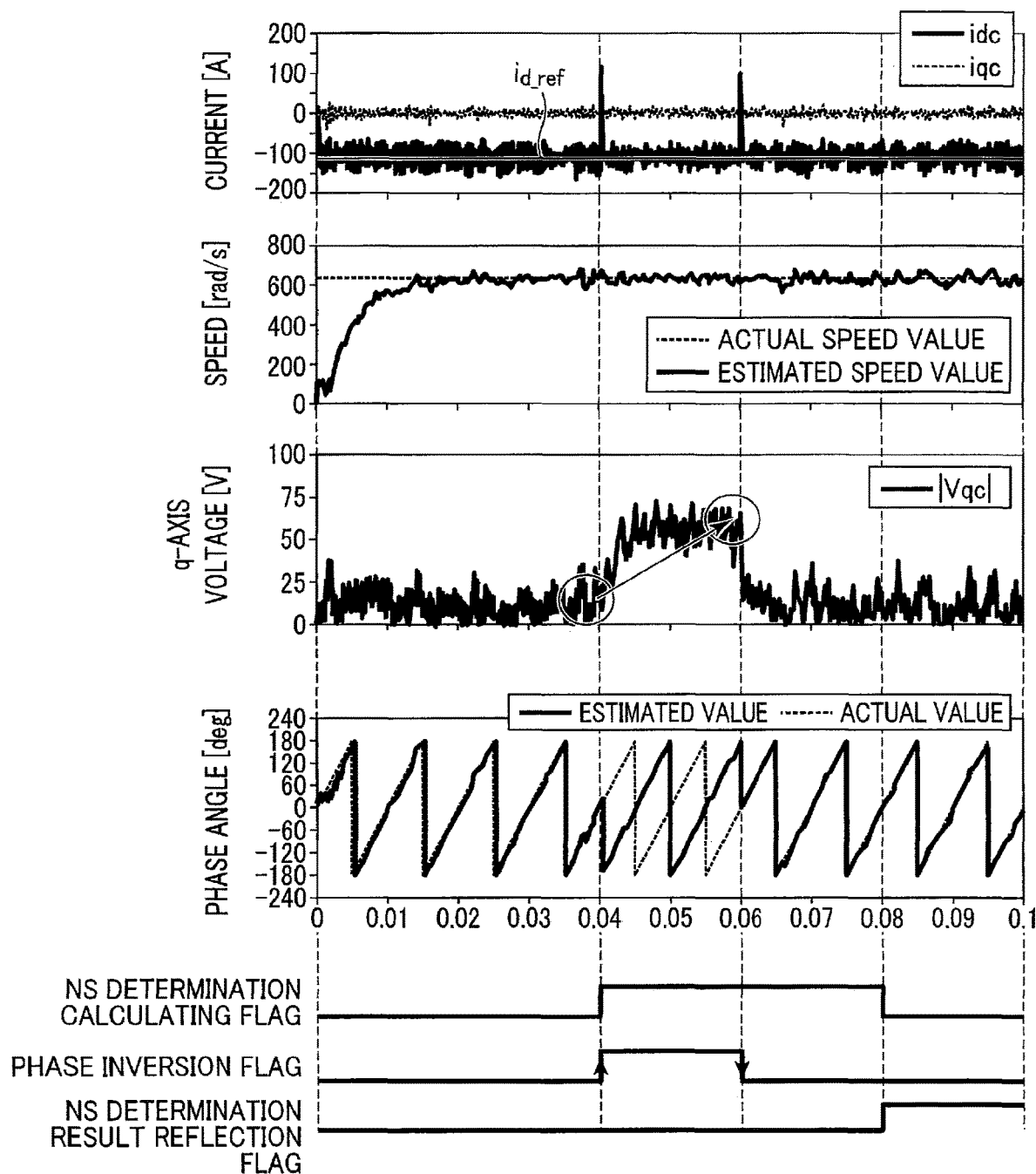
F I G. 20

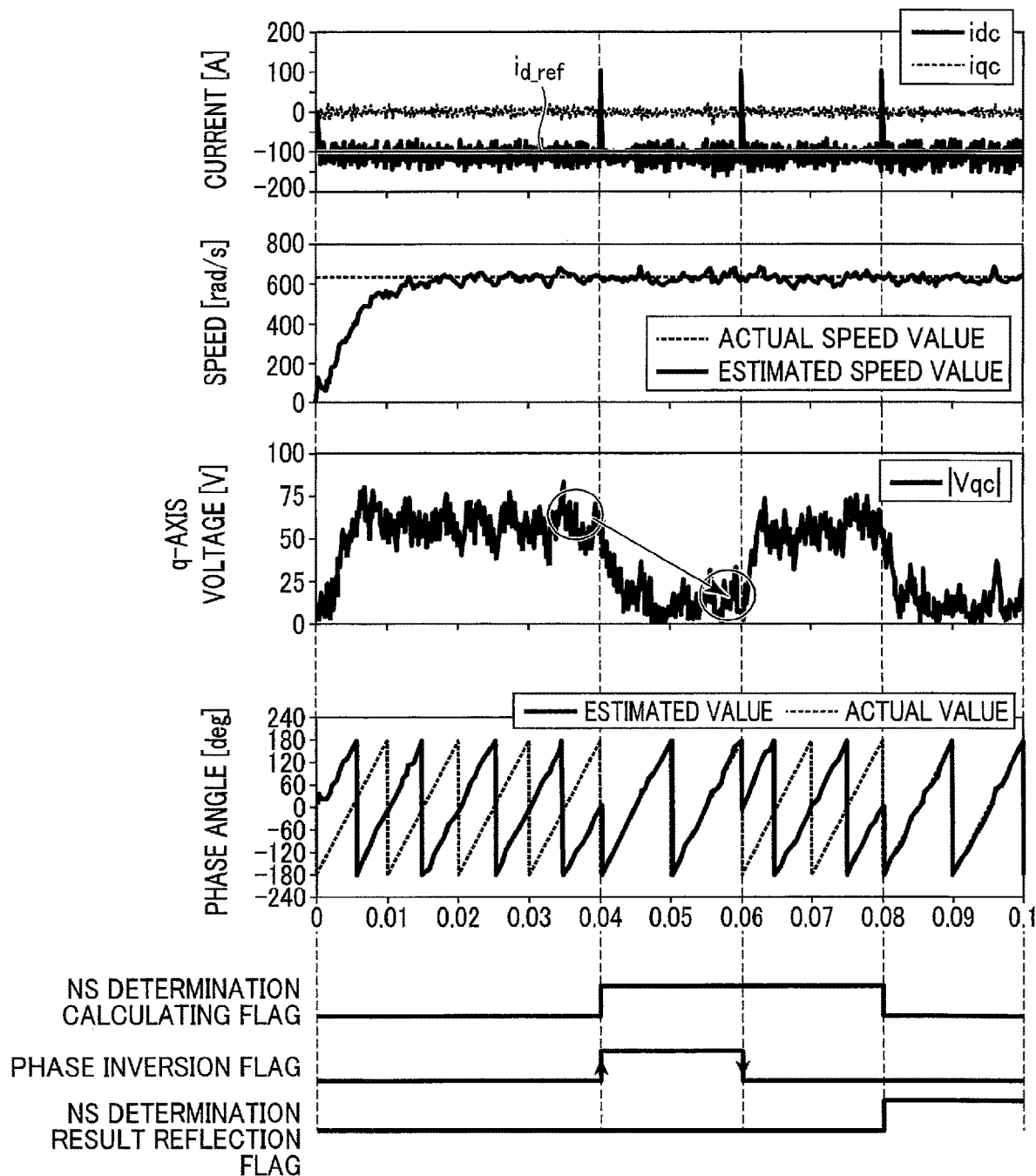
F I G. 21

INVERTER CONTROL DEVICE AND DRIVE SYSTEM

CROSS REFERENCE TO RELATED APPLICATIONS

This application is a Continuation Application of PCT Application No. PCT/JP2017/029972, filed Aug. 22, 2017 and based upon and claiming the benefit of priority from Japanese Patent Application No. 2016-162199, filed Aug. 22, 2016, the entire contents of all of which are incorporated herein by reference.

FIELD

Embodiments described herein relate generally to an inverter control device and a drive system.

BACKGROUND

In a control device of an inverter which drives a magnet-type synchronous motor, to realize the downsizing, the reduction of weight, the reduction of cost and the enhancement of reliability of the control device, there has been proposed a rotary sensorless control method which does not use a rotary sensor such as a resolver or an encoder. In the rotary sensorless control, it is desirable that a rotary phase angle and a rotational speed can be estimated within a wide speed range from stopping of the inverter to a maximum high speed.

For example, in applying a rotary sensorless control to a synchronous electric motor having a magnet in a rotor, positional information of a magnetic pole (at least one of an N pole and an S pole) of the magnet is indispensable.

However, in a method which uses a harmonic current, there has been a case where it is difficult to detect the harmonic current during a high speed rotation so that accuracy of determination of the position of a magnetic pole of the magnet is lowered. Further, there has been a case where applying of a harmonic voltage generates noise.

Further, even with respect to an electric motor of a method which uses a magnet induced voltage, in the case of an electric motor having a small magnet magnetic flux, for example, an electric motor which positively makes use of a reluctance torque, even when the electric motor is rotated at a high speed, a non-load induced voltage is scarcely generated and hence, it is difficult to determine a magnetic pole position of a magnet by making use of a voltage signal.

BRIEF DESCRIPTION OF THE DRAWINGS

FIG. 1 is a block diagram schematically showing a configuration example of an inverter control device and a drive system of a first embodiment.

FIG. 4 is a view for describing a configuration example of a part of an electric motor shown in FIG. 1.

FIG. 5 is a block diagram schematically showing a configuration example of a polarity determination part of the inverter control device of the first embodiment.

FIG. 10 is a view showing an example of a simulation result with respect to the inverter control device of the first embodiment.

FIG. 11 is a block diagram schematically showing a configuration example of a polarity determination part of an inverter control device of a second embodiment.

FIG. 17 is a view showing an example of a simulation result of a polarity determination operation performed by the inverter control device of the embodiment.

FIG. 20 is a view showing an example of a simulation result of a polarity determination operation performed by the inverter control device of the embodiment.

FIG. 21 is a view showing an example of a simulation result of a polarity determination operation performed by the inverter control device of the embodiment.

DETAILED DESCRIPTION

Figure 2:
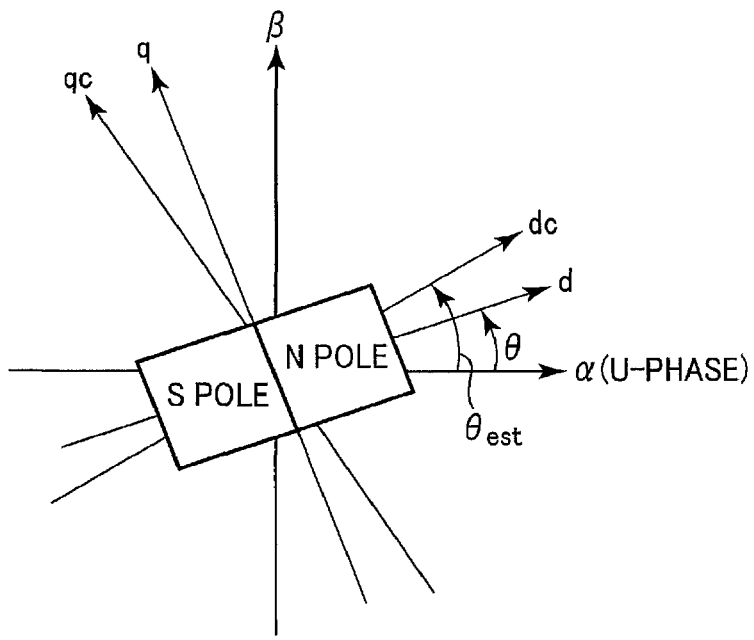
FIG. 2 is a view for explaining definitions of a d-axis, a q-axis, and an estimated rotatory coordinate system according to the embodiment.

Embodiments described herein have been made in view of the above-mentioned circumstances, and it is an object of the present invention to provide an inverter control device and a drive system capable of enhancing accuracy of a rotary sensorless control of an electric motor.

An inverter control device according to embodiments comprises a current command generator that generates a current command value; a current detector that detects a current value of an alternating current to be outputted from an inverter circuit to an electric motor; a gate command generator that generates a gate command to the inverter circuit such that the current command value and the current value detected by the current detector match, and obtains an output voltage target vector of the inverter circuit based on the gate command; a rotary phase angle estimator that obtains a rotary phase angle estimated value of the electric motor based on the current value detected by the current detector and the output voltage target vector; and a polarity determination part that, with supply of a current in synchronism with a rotor frequency of the electric motor, performs determination of a magnet magnetic pole of the electric motor using a generated magnetic flux or voltage in synchronism with the generated rotor frequency or both of the magnetic flux and the voltage, and outputs a correction value for the rotary phase angle estimated value based on a result of the determination. Hereinafter, inverter control devices and drive systems of embodiments are described in detail with reference to drawings.

FIG. 1 is a block diagram schematically showing a configuration example of an inverter control device and a drive system of a first embodiment. The inverter control device 1 of the embodiment is, for example, an inverter control device capable of controlling an inverter circuit which drives a permanent magnet synchronous motor having magnetic saliency. The inverter control device is mounted on a drive system which drives a vehicle.

The drive system shown in FIG. 1 includes an electric motor M, an inverter circuit INV, an inverter control device 1, and a host controller CTR. The inverter control device 1 includes a current command generator 10, a dq/αβ converter 20, an angle calculator 30, a gate command generator 40, a three-phase/αβ converter 50, a rotary phase angle estimator 60, a polarity determination part 70, and a current sensor 80.

The current command generator 10 receives a current amplitude command idq_ref, a current phase command β_ref, and a current conducting flag Ion from the host controller CTR. The current command generator 10 calculates a d-axis current command value id_ref and a q-axis current command value iq_ref to be supplied to the electric motor M based on the current amplitude command and the current phase command, and outputs the values when a current conducting flag Ion is ON (high level). The d-axis current command value id_ref and the q-axis current command value iq_ref are obtained by the following formulae.

$$id\_ref = -idq\_ref \cdot \sin \beta\_ref$$

$$iq\_ref = idq\_ref \cdot \cos \beta\_ref$$

FIG. 2 is a view for explaining definitions of a d-axis, a q-axis, and an estimated rotatory coordinate system (a dc-axis, a qc-axis) according to the embodiment.

The d-axis is a vector axis at which a static inductance becomes the smallest in a rotor of the electric motor M, and the q-axis is a vector axis orthogonal to the d-axis at an electric angle. On the other hand, the estimated rotatory coordinate system corresponds to the d-axis and the q-axis at an estimated position of the rotor. That is, the dc-axis is a vector axis rotated from the d-axis by an estimated error $\Delta\theta$, and the qc-axis is a vector axis rotated from the q-axis by the estimated error $\Delta\theta$. The d-axis current command value id_ref obtained by the above formula is a vector value in a direction rotated 180 degrees from the dc-axis. The q-axis current command value iq_ref obtained by the above formula is a vector value in the direction of the qc-axis.

To the dq/αβ converter 20, the d-axis current command value id_ref, the q-axis current command value iq_ref, and an estimated value θest of a rotary phase angle are inputted. The dq/αβ converter 20 is a vector converter which converts the d-axis current command value id_ref and the q-axis current command value iq_ref expressed by a coordinate system of the dq-axes into an α-axis current command value iα_ref and a β-axis current command value iβ_ref expressed by a fixed coordinate system of αβ-axes. The α-axis indicates a U-phase coil axis of the electric motor M, and the β-axis is an axis orthogonal to the α-axis. Values expressed by the fixed coordinate system of the αβ-axes can be calculated without using a rotor phase angle of the electric motor.

A subtractor of a current controller is arranged at a subsequent stage of the dq/αβ converter 20. The α-axis current command value iα_ref and the β-axis current command value iβ_ref outputted from the dq/αβ converter 20 are inputted to the subtractor. Furthermore, current values of currents of at least two phases outputted from an inverter circuit INV are detected by a current sensor 80, and current values iα_FBK, iβ_FBK converted into the αβ-axes fixed coordinate system by the three-phase/αβ converter 50 are inputted to the subtractor. The subtractor outputs a current vector deviation Δiα between the α-axis current command value iα_ref and a current value iα_FBK outputted from the inverter circuit INV, and a current vector deviation Δiβ between the β-axis current command value iβ_ref and the current value iβ_FBK outputted from the inverter circuit INV.

To the angle calculator 30, the current vector deviation Δiα and the current vector deviation Δiβ outputted from the subtractor are inputted. The angle calculator 30 calculates an angle θi of current vector deviation of the αβ-axis (fixed coordinate system) from the inputted current vector deviations Δiα, Δiβ. The angle θi is obtained as arc tangents (tan$^{-1}$) of the current vector deviations Δiα, Δiβ.

Figure 3:
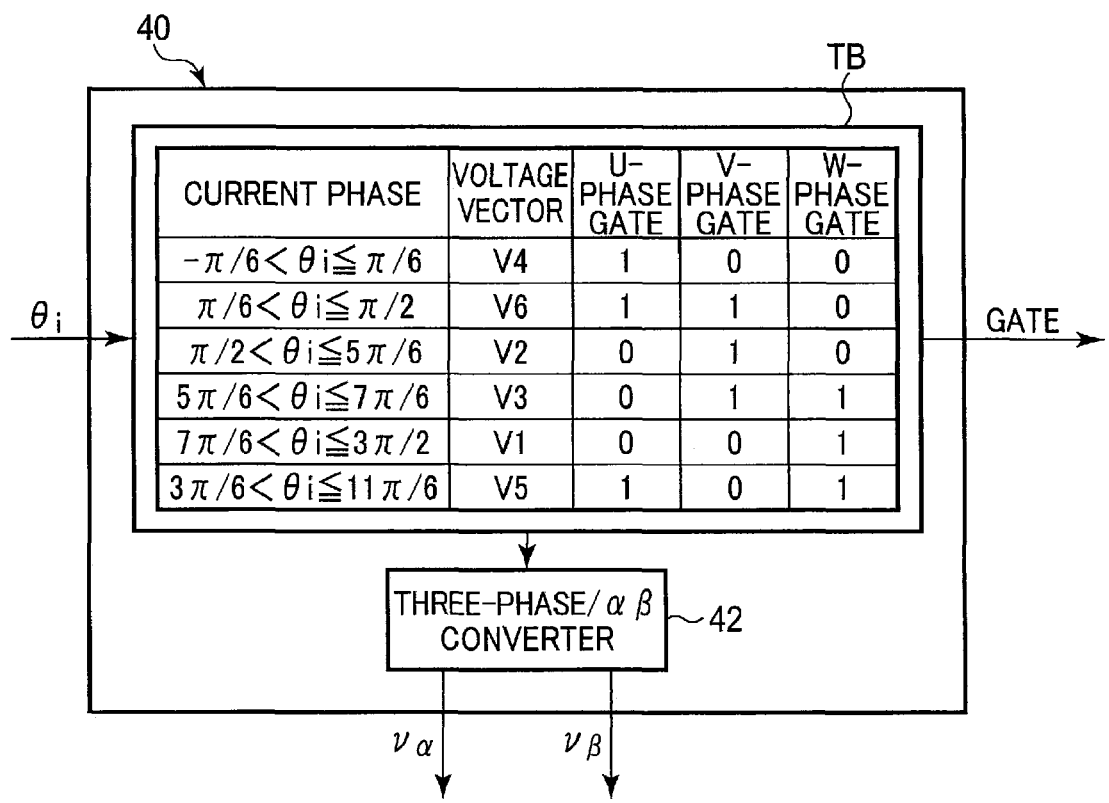
FIG. 3 is a view for describing a configuration example of a gate command generator shown in FIG. 1.

FIG. 3 is a view for describing a configuration example of a gate command generator 40 shown in FIG. 1.

The gate command generator 40 outputs gate commands to be supplied to switching elements of a U-phase, a V-phase and a W-phase of the inverter circuit INV so that current command values and current values actually outputted from the inverter circuit INV match.

In this embodiment, the inverter circuit INV has six switching elements (two switches for each phase) (not shown in the drawing) and, therefore, eight combinations are considered as a combination state of the switching elements. Accordingly, by considering a phase difference of each phase in an output voltage of the inverter circuit INV, eight voltage vectors corresponding to respective switching states are assumed. The eight voltage vectors may be expressed as being formed of: six basic voltage vectors V1 to V6 having phases different from each other by π/3 and having the same magnitude; and two zero voltage vectors V0 and V7. In such a state, the eight voltage vectors V0 to V7 correspond to the eight types of the switching states. For example, the voltage vectors are expressed as "1" when the switching element on a positive side of each phase is ON, and are expressed as "0" when the switching element on a negative side of each phase is ON.

In the embodiment, an example of a current tracking type PWM control is described. In this current tracking type PWM control, a gate command is generated by selecting a non-zero voltage vector (voltage vectors V1 to V6 other than the zero voltage vectors V0=(000) and V7=(111)) based on a current command value and an angle θi of a current vector deviation of a detected current. The voltage vector V1 corresponds to (001) when expressed by a UVW gate command. In the same manner, voltage vectors V2 to V7 and V0 correspond to (010), (011), (100), (101), (110), (111) and (000) respectively. Among these voltage vectors, the voltage vectors V0 and V7 are referred to as zero voltage vectors since an UVW interphase voltage is 0V. The voltage vectors V2 to V6 are referred to as non-zero voltage vectors. When the inverter circuit INV outputs the zero voltage vector V0 or the zero voltage vector V7, a current is changed only by an induced voltage of the rotor, and a change amount of the current becomes small. Accordingly, in the embodiment, in order to increase a current differential term in detecting the rotor position, only the non-zero voltage vectors are selected as the voltage vector.

The gate command generator 40 includes: a table TB in which gate commands of a U-phase, a V-phase and a W-phase with respect to a range of an angle θi are stored; and a three-phase/αβ converter 42.

The gate command generator 40 uses the table TB to select a voltage vector closest to a vector of an angle θi using a voltage vector V4 (=0) as a reference, and outputs a gate command corresponding to the selected voltage vector.

The three-phase/αβ converter 42 receives gate commands outputted from the table TB, and calculates output voltage target vectors Vα and Vβ of an αβ-axis fixed coordinate system by performing an αβ conversion on the gate commands corresponding to the U, V and W phases, and outputs the output voltage target vectors Vα and Vβ. The output voltage target vectors Vα and Vβ are obtained by performing the αβ conversion on three-phase alternating-current voltage commands calculated from the gate commands of the inverter circuit INV, and are vector values of output voltages of the inverter circuit INV which the gate commands intend to realize.

The inverter circuit INV includes: a direct-current power source (direct-current load); two switching elements of a U-phase; two switching elements of a V-phase; and two switching elements of a W-phase. The two switching elements of each phase are connected in series between a direct-current line connected to a positive electrode of the direct-current power source and a direct-current line connected to a negative electrode of the direct-current power source. The switching elements of the inverter circuit INV are controlled in accordance with gate commands received from the gate command generator 40. The inverter circuit INV is a three-phase alternating-current inverter which outputs a U-phase current Iu, a V-phase current Iv, and a W-phase current Iw to the electric motor M which is an alternating-current load. The inverter circuit INV is also capable of charging an electric power generated at the electric motor M to a secondary battery which is a direct-current power source.

FIG. 4 is a view for describing a configuration example of a part of the electric motor shown in FIG. 1.

In FIG. 4, only a part of the electric motor M is shown. The stator 100 and the rotor 200 of the electric motor M are respectively formed by combining a plurality of configurations shown in FIG. 4, for example.

The electric motor M is a permanent magnet synchronous motor having magnetic saliency. The electric motor M is, for example, a magnet-type synchronous motor including the stator 100 and the rotor 200. The rotor 200 includes air gaps 210, outer circumferential bridges BR1, center bridges BR2, and magnets MG.

The center bridges BR2 are arranged along lines extending from a center toward an outer circumferential portion of the rotor 200. The line on which the center bridge BR2 is arranged forms a d-axis. The outer circumferential bridges BR1 are positioned between an outer circumference of the rotor 200 and the air gaps 210. On a portion of the electric motor M shown in FIG. 4, six air gaps 210 extending from the outer circumferential portion toward the center portion of the rotor 200 are provided. The air gaps 210 extend between the center bridge BR2 and the outer circumferential bridges BR1 in line symmetry with respect to the d axis. A magnet MG for stabilizing a magnetic path is disposed at an end portion of the air gap 210 on a center bridge BR2 side.

In the initial estimation when activating the inverter circuit INV, the rotary phase angle estimator 60 calculates a rotary phase angle estimated value of the electric motor M based on current values detected by the current sensors 80, output voltage target values Vα and Vβ of the inverter circuit INV, and a phase angle estimated value θest.

The rotary phase angle estimator 60 includes an αβ/dq converter 62, an estimated error calculator 64, a PLL calculator 66, a low-pass filter FL1, and an integrator 68.

The αβ/dq converter 62 receives a rotary phase angle estimated value θest from the integrator 68, receives the output voltage target vectors Vα and Vβ of the αβ-axis fixed coordinate system from the gate command generator, and receives current values iα_FBK and iβ_FBK of the αβ-axis fixed coordinate system from the three-phase/αβ converter 50. These vector values are converted into a dq-axis coordinate system, and converted values are outputted. The values outputted from the αβ/dq converter 62 are voltage vectors Vdc and Vqc and current vectors idc and iqc of a dcqc coordinate system including an estimated error Δθ.

The estimated error calculator 64 receives the voltage vectors Vdc and Vqc and the current vectors idc and iqc from the αβ/dq converter 62, and calculates the estimated error Δθ based on these vectors. Calculation equations of the estimated error Δθ will be explained hereinafter.

In the magnet-type synchronous motor, a voltage equation when a rotary phase angle error Δθ is zero, that is, when actual dq-axes and estimated dcqc-axes match is expressed by a following [Formula 1].

[Mathematical 1]

$$\begin{bmatrix} v_d \\ v_q \end{bmatrix} = \begin{bmatrix} R + pL_d & -\omega_e L_q \\ \omega_e L_d & R + pL_q \end{bmatrix} \begin{bmatrix} i_d \\ i_q \end{bmatrix} + \omega_e \begin{bmatrix} 0 \\ \Psi_d \end{bmatrix} \quad \text{[Formula 1]}$$

In the above-mentioned [Formula 1], vd, vq: dq-axes voltages, id, iq: dq-axes currents, R: coil resistance of the electric motor, ωe: electric angle angular velocity, Ld, Lq: dq-axis inductance, p: differential operator (=d/dt).

To modify [Formula 1] by converting [Formula 1] into a dcqc-axes coordinate system which is an estimated coordinate system into the form of an extended induced voltage equation, [Formula 2] to [Formula 4] are obtained.

[Mathematical 2]

$$\begin{bmatrix} v_{dc} \\ v_{qc} \end{bmatrix} = \begin{bmatrix} R + pL_d & -\omega_e L_q \\ \omega_e L_q & R + pL_d \end{bmatrix} \begin{bmatrix} i_{dc} \\ i_{qc} \end{bmatrix} + \begin{bmatrix} e_{dc} \\ e_{qc} \end{bmatrix} \quad \text{[Formula 2]}$$

$$\begin{bmatrix} e_{dc} \\ e_{qc} \end{bmatrix} = E_{0x} \begin{bmatrix} -\sin\Delta\theta \\ \cos\Delta\theta \end{bmatrix} \quad \text{[Formula 3]}$$

$$E_{0x} = (L_d - L_q)(\omega i_d - pi_q) + \omega\psi_d \quad \text{[Formula 4]}$$

$E_{0x}$ calculated using [Formula 4] is referred to as an extended induced voltage.

To modify [Formula 2] by assuming an estimated value of a rotational speed as ωest and an estimated value of a rotary phase angle as θest, [Formula 5] is obtained.

[Mathematical 3]

$$\begin{bmatrix} -E_{ox}\sin\Delta\theta \\ E_{ox}\cos\Delta\theta \end{bmatrix} = \begin{bmatrix} v_{dc} \\ v_{qc} \end{bmatrix} - \begin{bmatrix} R+pL_d & -\omega_e L_q \\ \omega_e L_q & R+pL_d \end{bmatrix} \begin{bmatrix} i_{dc} \\ i_{qc} \end{bmatrix} \quad \text{[Formula 5]}$$

[Formula 6] is obtained by dividing a d-axis in [Formula 5] by a q-axis.

[Mathematical 4]

$$\frac{-E_x\sin\Delta\theta}{E_x\cos\Delta\theta} = -\tan\Delta\theta = \frac{\{v_{dc} - (R+pL_d)i_{dc} - \omega_e L_q i_{qc}\}}{\{v_{qc} + \omega_e L_q i_{dc} - (R+pL_d)i_{qc}\}} \quad \text{[Formula 6]}$$

[Formula 7] is obtained by modifying the above-mentioned [Formula 6] in the form of an arc tangent.

[Mathematical 5]

$$\Delta\theta = -\tan^{-1}\left\{\frac{\{v_{dc} - (R+pL_d)i_{dc} - \omega_e L_q i_{qc}\}}{\{v_{qc} + \omega_e L_q i_{dc} - (R+pL_d)i_{qc}\}}\right\} \quad \text{[Formula 7]}$$

By substituting a rotational speed ωe in [Formula 7] for an estimated value ωest, a rotary phase angle error Δθest can be calculated. Further, a rotational speed estimated value ωest is calculated by performing a PLL control such that a rotary phase angle error Δθest becomes zero. A rotary phase angle estimated value θest is calculated by integrating calculated rotational speed estimated value ωest. In this manner, the motor can be driven in a rotation angle sensorless mode.

The method of estimating a rotary phase angle and a rotational speed using an extended induced voltage has been described above. However, in the case where a magnet-type synchronous motor is driven by a rotary sensorless control, it is necessary to perform magnet polarity determination (NS determination). When magnetic polarities are erroneously estimated, there is a concern that a motor is rotated reversely. Accordingly, highly accurate polarity estimation is required.

FIG. 5 is a block diagram schematically showing a configuration example of a polarity determination part of the inverter control device of the first embodiment.

The polarity determination part 70 performs, in the initial estimation at the time of starting the inverter circuit INV, magnet magnetic pole determination using a magnetic flux or a voltage which is synchronous with rotor frequency of the motor M generated when a current in synchronism with the rotor frequency of the motor M is supplied or using both of the magnetic flux and the voltage. Then, the polarity determination part 70 outputs a correction value θNS for an estimated value θest' of a rotary phase angle based on a result of the determination. In this embodiment, the polarity determination part 70 performs the magnet magnetic pole determination using a d-axis basic wave magnetic flux or a q-axis voltage generated based on a basic wave magnetic flux generated when a current in a d-axis direction is supplied.

Figure 6:
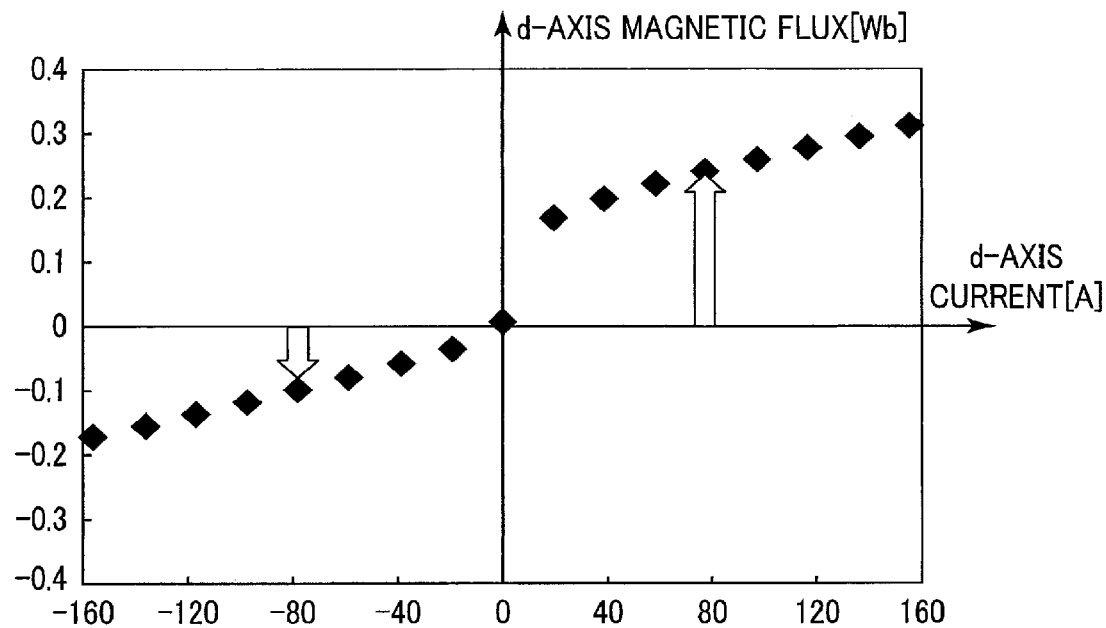
FIG. 6 is a view showing an example of a d-axis current –d-axis basic wave magnetic flux characteristic of a magnet-type synchronous motor.

FIG. 6 is a view showing an example of a d-axis current −d-axis basic wave magnetic flux characteristic of a magnet-type synchronous motor.

In this embodiment, in the electric motor M, magnitude of a d-axis interlinkage magnetic flux differs between the case where a current is supplied to a +d-axis and the case where a current is supplied to a −d-axis. In view of the above, the polarity determination part 70 performs magnet polarity determination of the electric motor M based on the above-mentioned difference in the d-axis interlinkage magnetic flux. The above-mentioned difference in the d-axis interlinkage magnetic flux occurs not only in a motor having a small magnet amount but also in a motor having a large magnet amount.

The polarity determination part 70 calculates a q-axis voltage set value $V_{d\_FF}$ using [Formula 8], and calculates a voltage difference ΔVq_NS which becomes the reference in NS determination using [Formula 9]. A q-axis voltage actual value Vqc can be expressed by [Formula 10].

[Mathematical 6]

$$v_{q\_FF} = \omega_{est} \cdot L_{d\_FF} \cdot i_{d\_ref} \quad \text{[Formula 8]}$$

$$\Delta v_{q\_NS} = v_{qc} - v_{q\_FF} \quad \text{[Formula 9]}$$

where $v_{qc} = \omega_{est} L_d i_{dc}$ \quad [Formula 10]

Figure 7:
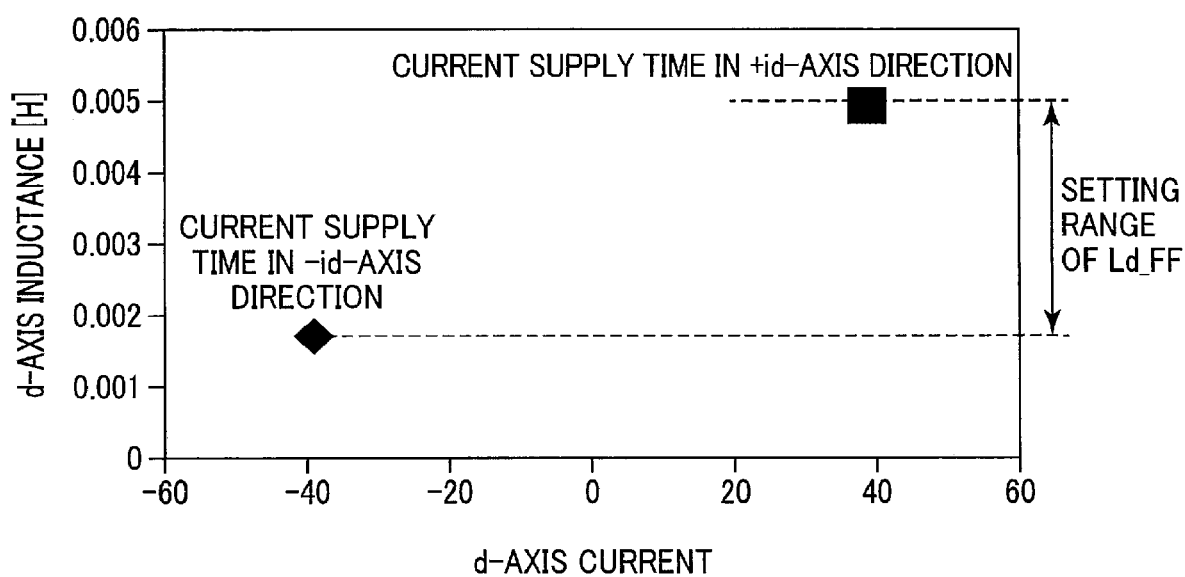
FIG. 7 is a view for describing an example of a setting range of a d-axis inductance set value in the inverter control device of the embodiment.

FIG. 7 is a view for describing an example of a setting range of a d-axis inductance set value in the inverter control device of the embodiment.

It is sufficient that a d-axis inductance set value $L_{d\_FF}$ be a value between a d-axis inductance generated when a current is supplied in a +d-axis direction and a d-axis inductance generated when the current is supplied in a −d-axis direction. In this embodiment, it is assumed that the d-axis inductance set value $L_{d\_FF}$ be an average value between the d-axis inductance generated when a current is supplied in a +d-axis direction and the d-axis inductance generated when the current is supplied in a −d-axis direction, for example.

In the case where a d-axis inductance set value $L_{d\_FF}$ is set and a current control is accurately performed, a current command value id_ref becomes equal to a d-axis current actual value idc, and a voltage difference ΔVq_NS assumes a relationship expressed by [Formula 11].

[Mathematical 7]

$$\Delta v_{q\_NS} = \omega_{est} \cdot i_{d\_ref} \cdot (L_d - L_{d\_FF}) \begin{cases} \geq 0 \ldots (\theta_{NS} = 0 \text{ deg}) \\ < 0 \ldots (\theta_{NS} = 180 \text{ deg}) \end{cases} \quad \text{[Formula 11]}$$

The polarity determination part 70 outputs a rotary phase and a correction value θNS for a rotation angle estimated by a speed estimation unit in accordance with the above-mentioned relationship expressed by the above-mentioned [Formula 11].

That is, the polarity determination part 70 includes multipliers 71, 72, a threshold value setting part Th, a subtractor 73, a filter FL2, and selectors 74, 75. The polarity determination part 70 receives a q-axis voltage Vqc, a d-axis current command id_ref and a rotational speed estimated value ωest as inputs.

The threshold value setting part Th outputs a d-axis inductance set value Ld_FF for calculating a q-axis voltage set value $V_{q\_FF}$ to the multiplier 72.

The multiplier 71 multiplies a d-axis current command id_ref and a rotational speed estimated value ωest, and outputs a multiplied value to the multiplier 72.

The multiplier 72 multiplies a calculated result obtained by the multiplier 71 by a d-axis inductance set value $L_{d\_FF}$ and outputs a multiplied value to the subtractor 73 as a q-axis voltage set value $V_{q\_FF}$.

The subtractor 73 subtracts a q-axis voltage set value $V_{q\_FF}$ from a q-axis voltage Vqc, and outputs a value obtained by subtraction as a voltage difference ΔVq_NS.

The filter FL2 is a low pass filter, for example, and outputs the voltage difference ΔVq_NS outputted from the subtractor 73 in a state where a high-frequency component contained in the voltage difference ΔVq_NS is removed.

The selector 74 determines whether or not the voltage difference ΔVq_NS outputted from the filter FL2 is zero or more, and outputs a value corresponding to a determination result. That is, the selector 74 sets an output value to "0" when the voltage difference ΔVq_NS is zero or more, and sets the output value to "1" when the voltage difference ΔVq_NS is less than zero.

The selector 75 outputs a correction value θNS based on a value outputted from the selector 74. That is, the selector 75 outputs π (180°) as the correction value θNS when the value outputted from the selector 74 is "1", and outputs 0° as the correction value θNS when the value outputted from the selector 74 is "0".

The correction value θNS outputted from the selector 75 is added to a rotary phase angle estimated value θest' outputted from the rotary phase angle estimator 60 so that the rotary phase angle estimated value θest' is corrected. The corrected rotary phase angle estimated value θest is supplied to the dq/αβ converter 20 and the αβ/dq converter 62 and is used for vector conversion.

Figure 8:
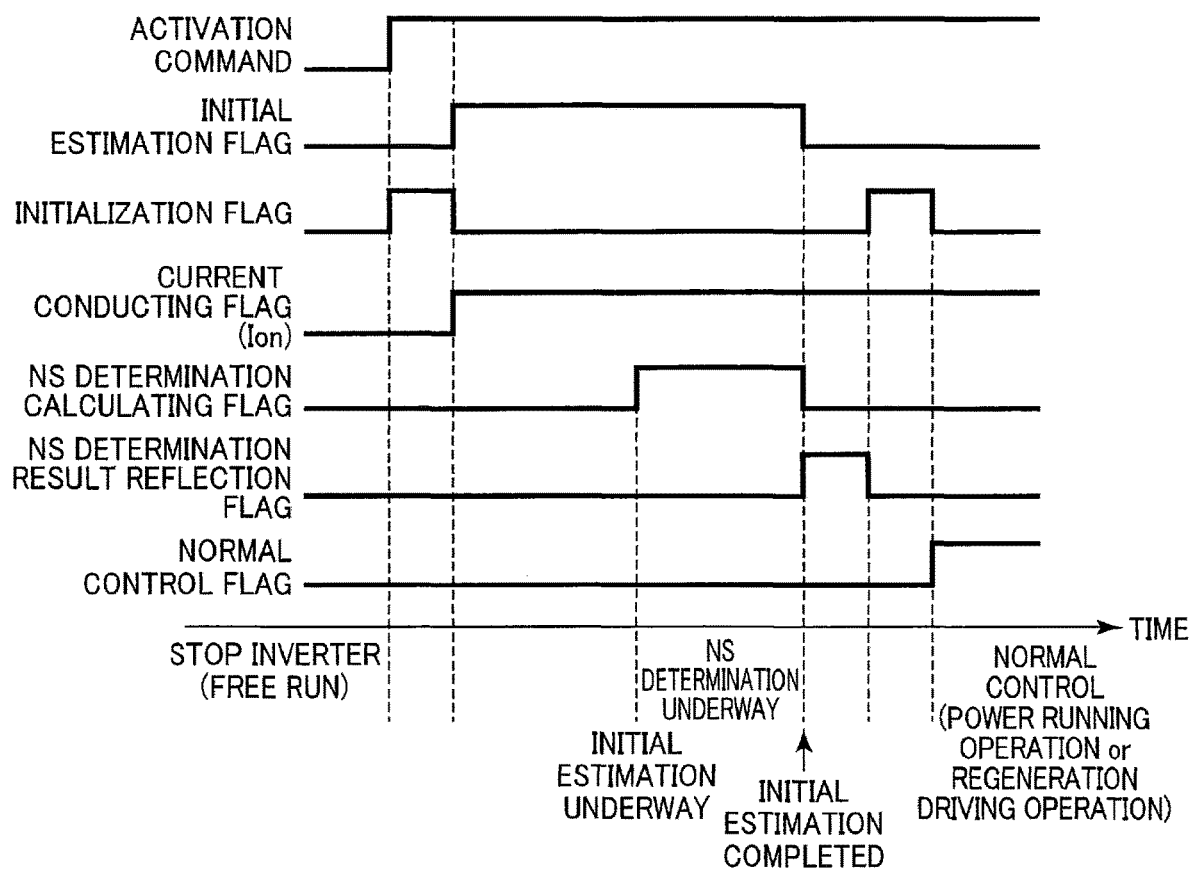
FIG. 8 is a view for describing an example of an operation of the inverter control device of the embodiment.

FIG. 8 is a view for describing an example of an operation of the inverter control device of the embodiment.

In the inverter control device 1 according to this embodiment, polarity determination is performed in the initial estimation at the time of starting the inverter circuit INV. That is, the calculation of a rotary phase angle estimated value by the rotary phase angle estimator 60 and the magnet magnetic pole determination by the polarity determination part 70 are performed in response to an activation command supplied to the inverter circuit INV. Before starting the inverter circuit INV or before the completion of the initial estimation, the inverter circuit INV is in a stopped state and the electric motor M is in a free run state.

The host controller CTR sets a current command id_ref, iq_ref and a current phase β_ref for supplying a current to the motor, and controls various flags (a current conducting flag (Ion), an initialization flag, an initial estimation flag, a NS determination calculating flag, an NS determination result reflection flag, a normal control flag). The host controller CTR supplies the initialization flag, the initial estimation flag, the normal control flag and the NS determination calculating flag to the rotary phase angle estimator 60. The host controller CTR supplies the NS determination result reflection flag to the polarity determination part 70. The host controller CTR supplies the current conducting flag (Ion) to the current command generator 10.

When the host controller CTR receives an activation command, the host controller CTR sets an initialization flag to "ON" simultaneously. Subsequently, the host controller CTR sets an initial estimation flag and a current conducting flag (Ion) to "ON" and sets the initialization flag to "OFF".

When the host controller CTR set the initialization flag to "ON", the rotary phase angle estimator 60 performs initialization by setting an estimated rotary phase angle to an initial value and by setting an estimated value of a rotational speed to an initial value. Subsequently, when the host controller CTR sets the initial estimation flag to "ON", the calculation of a rotary phase angle estimated value θest and a rotational speed estimated value ωest is started.

Then, the host controller CTR sets an NS determination calculating flag to "ON". When the host controller CTR sets the NS determination calculating flag to "ON", the polarity determination part 70 calculates a voltage difference ΔVq_NS.

Then, the host controller CTR sets the initial estimation flag and the NS determination calculating flag to "OFF", and sets an NS determination result reflection flag to "ON".

When the host controller CTR sets the NS determination result reflection flag to "ON", the polarity determination part 70 outputs a correction value θNS for a rotation angle corresponding to the value of a voltage difference ΔVq_NS as shown in [Formula 11].

Then, the host controller CTR sets an NS determination result reflection flag to "OFF" and sets an initialization flag to "ON".

When the host controller CTR sets the initialization flag to "ON", the rotary phase angle estimator 60 performs initialization by setting an estimated value of the rotary phase angle and an estimated value of a rotational speed to initial values respectively.

Then, the host controller CTR sets the initialization flag to "OFF" and sets a normal control flag to "ON". The rotary phase angle estimator 60 finishes initial estimation processing when the normal control flag is set to "ON", and starts a power running operation or a regeneration driving operation.

Then, an example of a result of a simulation performed with respect to the inverter control device 1 of the above-mentioned embodiment is described. In this embodiment, the simulation result is described where a rotary phase angle estimated value, a rotational speed estimated value and a voltage difference ΔVq_NS are calculated.

Figure 9:
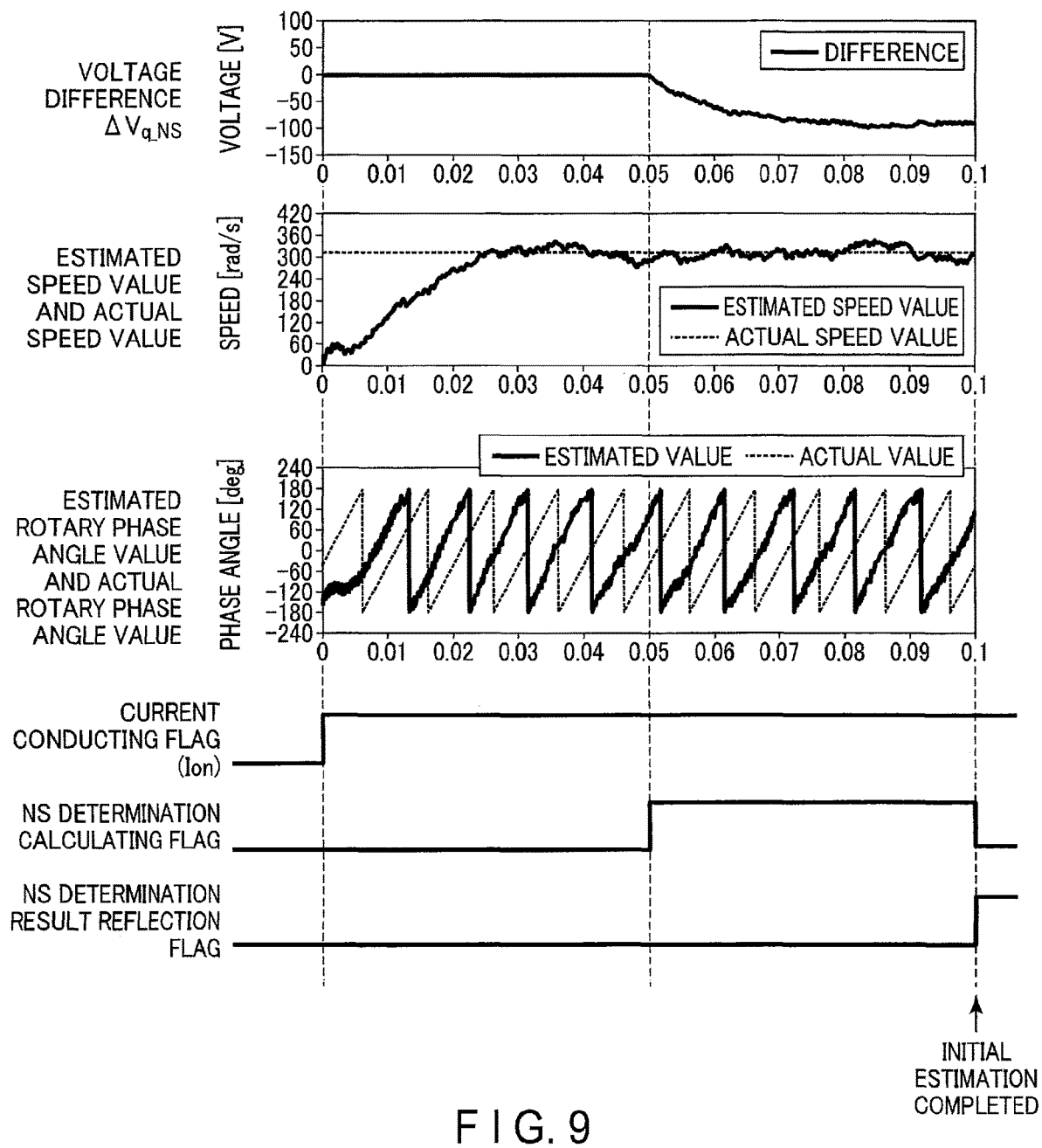
FIG. 9 is a view showing an example of a simulation result with respect to the inverter control device of the first embodiment.

FIG. 9 and FIG. 10 are views showing examples of simulation results with respect to the inverter control device of the first embodiment. FIG. 9 and FIG. 10 show the simulation results during a period including a period from a timing at which a current conducting flag Ion shown in FIG. 8 is set to "ON" to a timing at which an NS determination calculating flag is set to "OFF".

In the simulations, an example is shown where the inverter control device starts current conducting and starts calculation of an estimated rotary phase angle and an estimated value of a rotational speed at a point of time of 0 seconds, and completes initial estimation at a point of time of 0.1 seconds. The inverter control device starts calculation of polarity determination at a point of time of 0.05 seconds.

In the example shown in FIG. 9, an actual value of a rotary phase angle and an estimated value are displaced from each other by 180°. In this case, when a current conducting flag (Ion) is set to "ON" and, after a lapse of 0.05 seconds, a polarity determination calculating flag is set to "ON", the polarity determination is started, and a voltage difference $\Delta V_{q\_NS}$ takes a minus value. At this stage of the operation, in the inverter control device 1 of this embodiment, a correction value θNS assumes 180° and hence, an estimated value of the rotary phase angle is corrected whereby an estimated value and an actual value become equal.

In the example shown in FIG. 10, an actual value and an estimated value of a rotary phase angle are not displaced from each other. It is understood from this result that a voltage difference $\Delta V_{q\_NS}$ takes a positive value unlike the previously-mentioned result. At this stage of the operation, in the inverter control device 1 of this embodiment, a correction value θNS becomes 0° and hence, an estimated value of a rotary phase angle and an actual value of the rotary phase angle become equal.

The above-mentioned calculation is performed until a point of time of 0.1 sec at which the initial estimation is completed, and the magnetic pole correction is performed by adding θNS to the estimated rotary phase angle as 180° or 0° based on a voltage difference when the initial estimation is completed.

As described above, in this embodiment, also in driving a synchronous motor having a small non-load magnetic flux, the magnetic pole position can be determined with high accuracy. Further, in the inverter control device 1 and the drive system according to this embodiment, unlike a method of determining a magnetic pole position by making use of a harmonic voltage, polarity determination can be performed with high accuracy even when a rotational speed is increased and hence, there is no possibility that noise occurs.

That is, according to the inverter control device 1 and the drive system of this embodiment, accuracy of a rotary sensorless control of an electric motor can be enhanced.

Next, an inverter control device and a drive system of a second embodiment are described with reference to drawings.

The inverter control device 1 according to the second embodiment has substantially the same configuration as the above-mentioned first embodiment except for the configuration of the polarity determination part 70. In this embodiment, the polarity determination part 70 performs polarity determination using a difference in magnetic flux. In the description made hereinafter, constitutional parts of the second embodiment substantially equal to the corresponding constitutional parts of the first embodiment are given the same symbols, and the description of these constitutional parts is omitted.

FIG. 11 is a block diagram schematically showing a configuration example of the polarity determination part of the inverter control device of the second embodiment.

The polarity determination part 70 of this embodiment performs polarity determination using a q-axis voltage actual value Vqc, a d-axis current command id_ref, a rotational speed estimated value ωest, and an inductance set value $L_{d\_FF}$.

The polarity determination part 70 calculates an actual d-axis magnetic flux $\phi_{d\_act}$ using the following [Formula 12]. The polarity determination part 70 calculates a d-axis magnetic flux set value $\phi_{d\_FF}$ using the following formula [Formula 13]. The polarity determination part 70 calculates a magnetic flux difference $\Delta\phi_{d\_NS}$ which becomes the reference in polarity determination using the following [Formula 14].

[Mathematical 8]

$$\Phi_{d\_act} = \frac{v_{qc}}{\omega_{est}} = \frac{\omega_{est} L_d i_{dc}}{\omega_{est}} = L_d i_{dc} \quad \text{[Formula 12]}$$

$$\Phi_{d\_FF} = L_{d\_FF} \cdot i_{d\_ref} \quad \text{[Formula 13]}$$

$$\Delta\Phi_{d\_NS} = \Phi_{d\_act} - \Phi_{d\_FF} \quad \text{[Formula 14]}$$

The polarity determination part 70 includes a divider 76, a multiplier 77, a subtractor 78, a filter FL2, a threshold value setting part Th, and selectors 79, 75.

The divider 76 calculates an actual d-axis magnetic flux $\phi_{d\_act}$ by dividing a d-axis voltage actual value Vqc (=ωest·Ld·Idc) by a rotational speed estimated value ωest, and supplies the actual d-axis magnetic flux $\phi_{d\_act}$ to the subtractor 78.

The multiplier 77 calculates a d-axis magnetic flux set value $\phi_{d\_FF}$ by multiplying a d-axis current command id_ref and an inductance set value $L_{d\_FF}$ with each other, and supplies the d-axis magnetic flux set value $\phi_{d\_FF}$ to the subtractor 78.

The subtractor 78 calculates a magnetic flux difference $\Delta\phi_{d\_NS}$ by subtracting the d-axis magnetic flux set value $\phi_{d\_FF}$ from the actual d-axis magnetic flux value $\phi_{d\_act}$, and supplies the magnetic flux difference $\Delta\phi_{d\_NS}$ to the filter FL2.

The filter FL2 is a low pass filter, for example, and supplies the magnetic flux difference $\Delta\phi_{d\_NS}$ from which a high frequency component is removed to the selector 79.

The selector 79 determines whether or not the magnetic flux difference $\Delta\phi_{d\_NS}$ outputted from the filter FL2 is zero or more, and outputs a value corresponding to a determination result. That is, the selector 79 sets an output value to "0" when the magnetic flux difference $\Delta\phi_{d\_NS}$ is zero or more, and sets the output value to "1" when the magnetic flux difference $\Delta\phi_{d\_NS}$ is less than zero.

The selector 75 outputs a correction value θNS based on a value outputted from the selector 79. That is, the selector 75 outputs π (180°) as the correction value θNS when the value outputted from the selector 79 is "1", and outputs 0° as the correction value θNS when the value outputted from the selector 79 is "0".

The correction value θNS outputted from the selector 75 is added to a rotary phase angle estimated value θest' outputted from the rotary phase angle estimator 60 so that the rotary phase angle estimated value θest' is corrected. The corrected rotary phase angle estimated value θest is supplied to the dq/αβ converter 20 and the αβ/dq converter 62 and is used for vector conversion.

As described above, according to the inverter control device 1 and the drive system of this embodiment, in the same manner as the previously mentioned first embodiment, also in driving a synchronous motor having a small load magnetic flux, the magnetic pole position can be determined with high accuracy. Further, in the inverter control device 1 and the drive system according to this embodiment, unlike a method of determining a magnetic pole position by making use of a harmonic voltage, polarity determination can be performed with high accuracy even when a rotational speed is increased and hence, there is no possibility that noise occurs.

That is, according to the inverter control device 1 and the drive system of this embodiment, accuracy of a rotary sensorless control of an electric motor can be enhanced.

Next, an inverter control device and a drive system of a third embodiment are described with reference to drawings.

Figure 12:
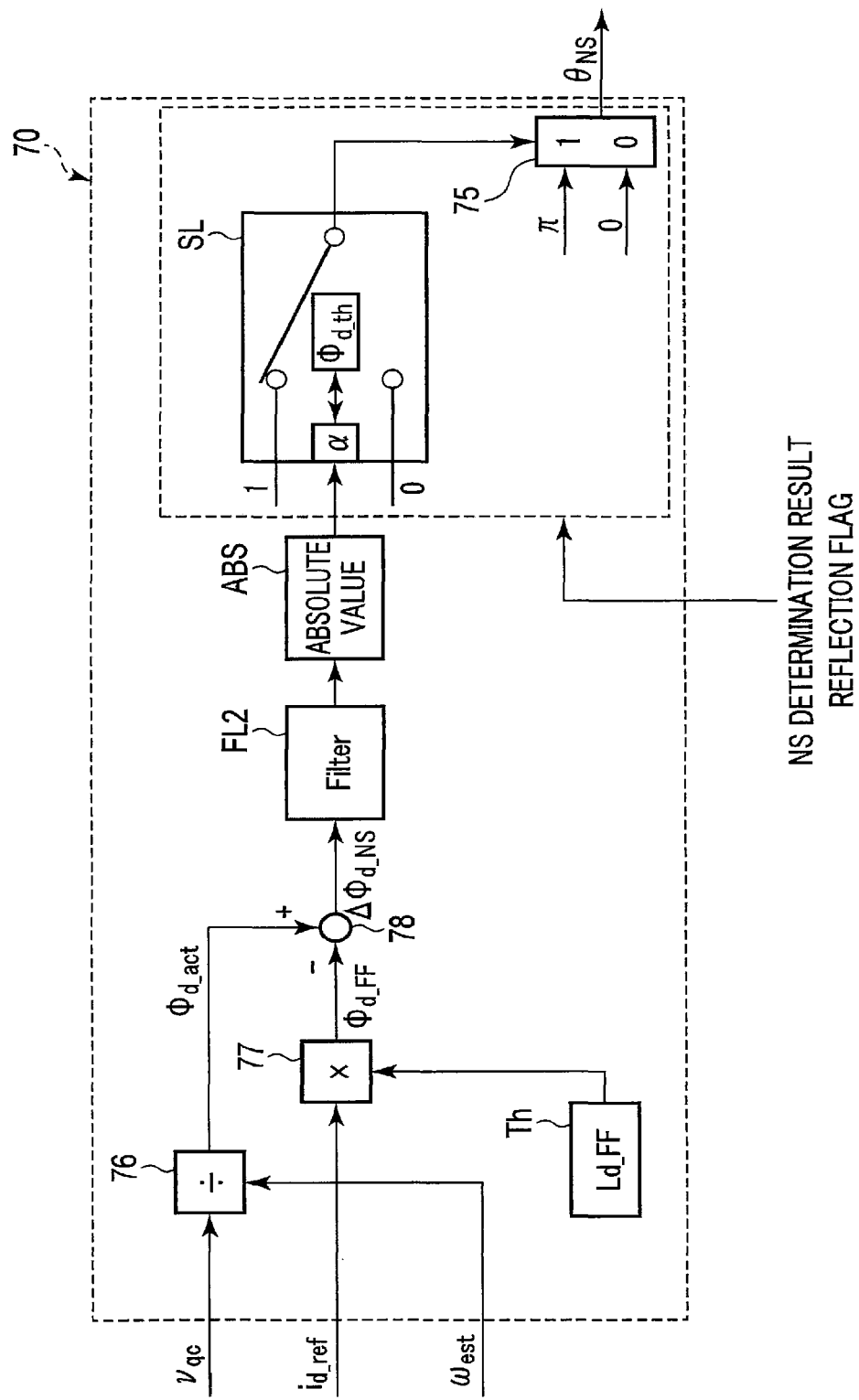
FIG. 12 is a block diagram schematically showing a configuration example of a polarity determination part of an inverter control device of a third embodiment.

FIG. 12 is a block diagram schematically showing a configuration example of a polarity determination part of the inverter control device of the third embodiment.

The inverter control device 1 of this embodiment differs from the above-mentioned first embodiment and second embodiment with respect to the configuration of a polarity determination part 70.

In this embodiment, the polarity determination part 70 performs polarity determination using a q-axis voltage actual value Vqc, a d-axis current command id_ref, an estimated rotational speed ωest, and an inductance set value $L_{d\_FF}$. In this case, a threshold value setting part Th sets the inductance set value $L_{d\_FF}$ such that the inductance set value $L_{d\_FF}$ matches an inductance generated when a current is supplied in a +d-axis or an inductance generated when a current is supplied in a −d-axis.

In this case, the polarity determination part 70 calculates an actual d-axis magnetic flux $\phi_{d\_act}$ using the above-mentioned [Formula 12]. The polarity determination part 70 calculates a d-axis magnetic flux set value $\phi_{d\_FF}$ using the above-mentioned [Formula 13]. The polarity determination part 70 calculates a magnetic flux difference $\Delta\phi_{d\_NS}$ which becomes a reference in polarity determination using the above-mentioned [Formula 14].

In the threshold value setting part Th, for example, assuming the inductance set value $L_{d\_FF}$ as an inductance value when a current is supplied in a −d-axis, a relationship between the inductance set value and the magnetic flux difference when a current control is performed with high accuracy is shown in [Formula 15].

[Mathematical 9]

$$|\Delta\Phi_{d\_NS}| = |(L_d - L_{d\_FF}) \cdot i_{d\_ref}| \quad \text{[Formula 15]}$$
$$\begin{cases} \geq \text{Threshold value} & \ldots (\theta_{NS} = 180 \text{ deg}) \\ < \text{Threshold value} & \ldots (\theta_{NS} = 0 \text{ deg}) \end{cases}$$

Figure 13:
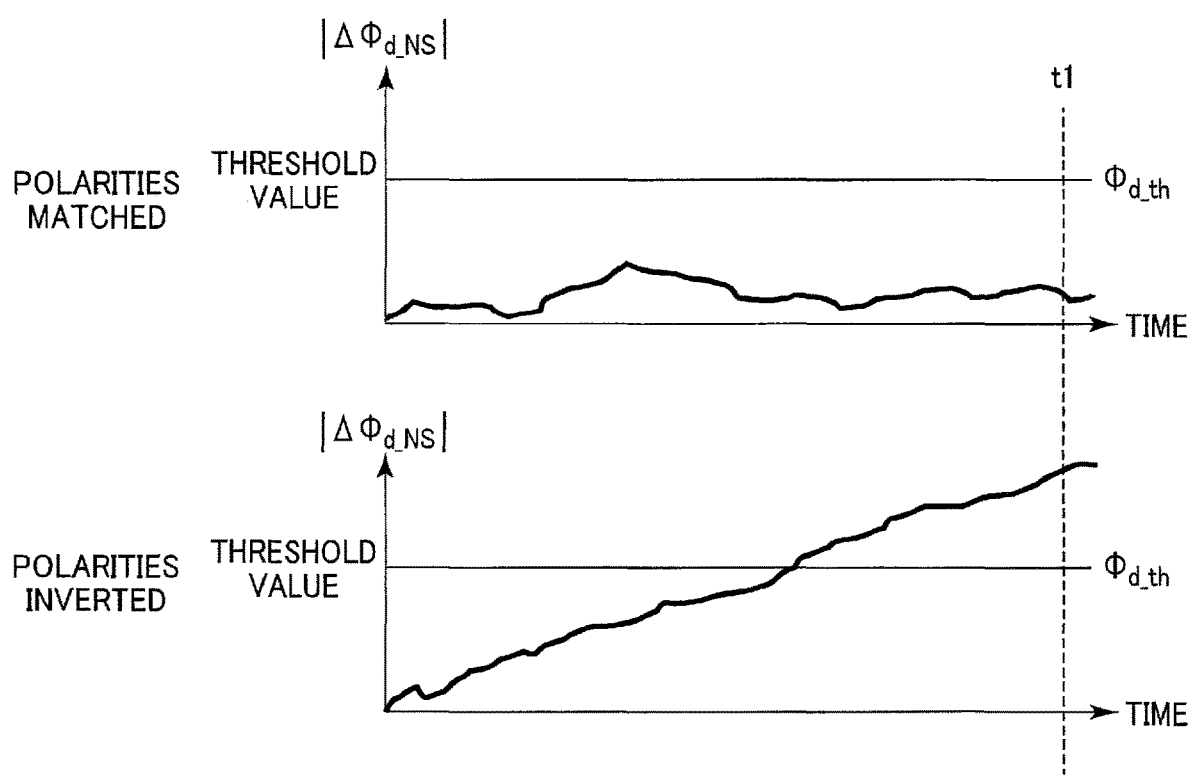
FIG. 13 is a view showing an example of a relationship between a predetermined threshold value and an absolute value of a magnetic flux difference $\Delta\phi d\_NS$.

FIG. 13 is a view showing an example of a relationship between a predetermined threshold value and an absolute value of a magnetic flux difference $\Delta\phi_{d\_NS}$.

The polarity determination part 70 determines that polarities (NS) match when an absolute value of the magnetic flux difference $\Delta\phi_{d\_NS}$ is lower than a predetermined threshold value $\phi_{d\_th}$ at a predetermined timing, and determines that the polarities (NS) are inverted when the absolute value of the magnetic flux difference $\Delta\phi_{d\_NS}$ is equal to or more than the predetermined threshold value $\phi d\_th$ at the predetermined timing.

In the threshold value setting part Th, in the case where the inductance set value $L_{d\_FF}$ is set to an inductance value when a current is supplied in a +d-axis, a determination result opposite to the above-mentioned determination result is obtained. That is, the polarity determination part 70 determines that polarities (NS) are inverted when the absolute value of the magnetic flux difference $\Delta\phi_{d\_NS}$ is lower than the predetermined threshold value, and determines that the polarities (NS) match when the absolute value of the magnetic flux difference $\Delta\phi_{d\_NS}$ is equal to or more than the predetermined threshold value.

The predetermined threshold value $\phi d\_th$ may be decided corresponding to an inductance difference or voltage detection accuracy when a current is supplied in a ±d-axis. For example, the predetermined threshold value $\phi d\_th$ may be determined by referencing a table with respect to a supply current.

That is, the polarity determination part 70 of this embodiment includes a divider 76, a multiplier 77, a subtractor 78, a threshold value setting part Th, a filter FL2, an absolute value calculator ABS, and selectors SL, 75.

The divider 76 calculates an actual d-axis magnetic flux $\phi_{d\_act}$ by dividing a d-axis voltage actual value Vqc (=ωest·Ld·Idc) by a rotational speed estimated value ωest, and supplies the actual d-axis magnetic flux $\phi_{d\_act}$ to the subtractor 78.

The multiplier 77 calculates a d-axis magnetic flux set value $\phi_{d\_FF}$ by multiplying a d-axis current command id_ref and an inductance set value $L_{d\_FF}$ to each other, and supplies the d-axis magnetic flux set value $\phi_{d\_FF}$ to the subtractor 78.

The subtractor 78 calculates a magnetic flux difference $\Delta\phi_{d\_NS}$ by subtracting a d-axis magnetic flux set value $\phi_{d\_FF}$ from an actual d-axis magnetic flux value $\phi_{d\_act}$, and supplies the magnetic flux difference $\Delta\phi_{d\_NS}$ to the filter FL2.

The filter FL2 is a low pass filter, for example, and supplies the magnetic flux difference $\Delta\phi_{d\_NS}$ from which a high frequency component is removed to the absolute value calculator ABS.

The absolute value calculator ABS calculates an absolute value of the magnetic flux difference $\Delta\phi_{d\_NS}$ outputted from the filter FL2, and outputs the absolute value of the magnetic flux difference $\Delta\phi_{d\_NS}$ to the selector SL.

The selector SL compares the absolute value of the magnetic flux difference $\Delta\phi_{d\_NS}$ outputted from the absolute value calculator ABS and a predetermined threshold value $\phi d\_th$, determines whether or not the magnetic flux difference $\Delta\phi_{d\_NS}$ is equal to or more than the threshold value $\phi d\_th$, and outputs a value corresponding to a determination result. That is, the selector 79 sets an output value to "1" when the magnetic flux difference $\Delta\phi_{d\_NS}$ is equal to or more than the threshold value $\phi d\_th$, and sets the output value to "0" when the magnetic flux difference $\Delta\phi_{d\_NS}$ is less than the threshold value $\phi d\_th$.

The selector 75 outputs a correction value θNS based on a value outputted from the selector SL. That is, the selector 75 outputs π (180°) as the correction value θNS when the value outputted from the selector SL is "1", and outputs 0° as the correction value θNS when the value outputted from the selector SL is "0".

The correction value θNS outputted from the selector 75 is added to a rotary phase angle estimated value θest' outputted from the rotary phase angle estimator 60 so that the rotary phase angle estimated value θest' is corrected. The corrected rotary phase angle estimated value θest is supplied to the dq/αβ converter 20 and the αβ/dq converter 62 and is used for vector conversion.

As described above, according to the inverter control device 1 and the drive system of this embodiment, in the same manner as the previously mentioned first embodiment, also in driving a synchronous motor having a small load magnetic flux, the magnetic pole position can be determined with high accuracy. Further, in the inverter control device 1 and the drive system according to this embodiment, unlike a method of determining a magnetic pole position by making use of a harmonic voltage, polarity determination can be performed with high accuracy even when a rotational speed is increased and hence, there is no possibility that noise occurs.

That is, according to the inverter control device and the drive system of this embodiment, accuracy of a rotary sensorless control of an electric motor can be enhanced.

Next, an inverter control device and a drive system of a fourth embodiment are described with reference to drawings.

Figure 14:
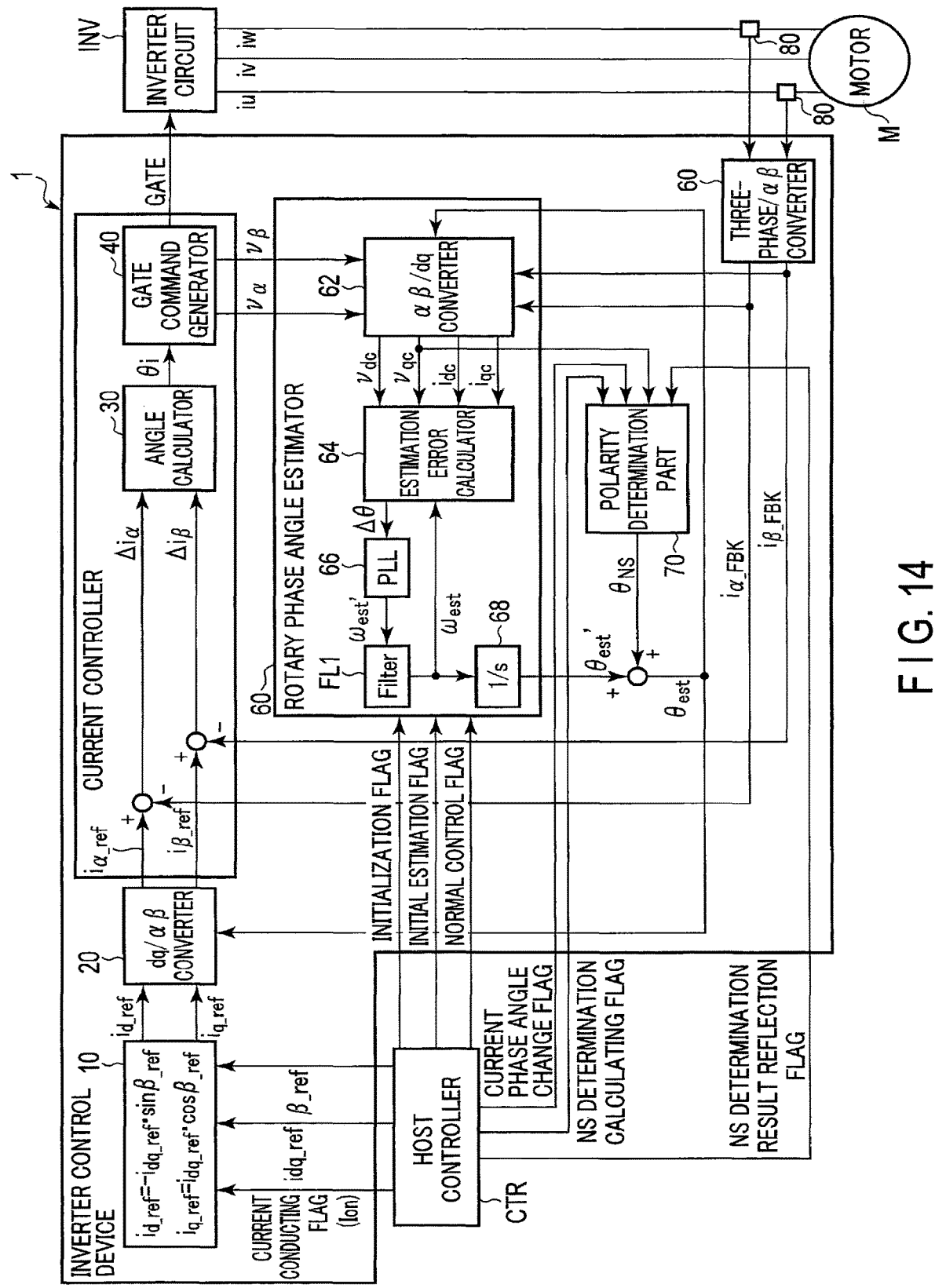
FIG. 14 is a block diagram schematically showing a configuration example of an inverter control device and a drive system of a fourth embodiment.

FIG. 14 is a block diagram schematically showing a configuration example of the inverter control device and a drive system of the fourth embodiment. In the inverter control device 1 and the drive system of this embodiment, polarities are determined based on a q-axis voltage generated when a d-axis current in a positive direction flows and a q-axis voltage generated when a d-axis current in a negative direction flows. That is, the polarity determination part 70 performs magnet magnetic pole determination of the electric motor based on a comparison result between a q-axis voltage value of the electric motor when a current is supplied aiming at a −d-axis direction and a q-axis voltage value of the electric motor when the current is supplied aiming at a +d-axis direction, and outputs a correction value for the rotary phase angle estimated value based on a determination result.

The inverter control device 1 and the drive system of this embodiment differ from the inverter control device 1 and the drive system of the above-mentioned first to third embodiments with respect to a flag supplied to the polarity determination part 70 and the configuration of the polarity determination part 70. That is, in this embodiment, a host controller CTR supplies a current phase angle change flag to the polarity determination part 70. The host controller CTR switches the current phase angle change flag from High (H) to Low (L) in synchronism with timing at which a command value of a d-axis current is switched from a positive direction to a negative direction, and switches the current phase angle change flag from Low (L) to High (H) in synchronism with timing at which a command value of a d-axis current is switched from a negative direction to a positive direction.

Figure 15:
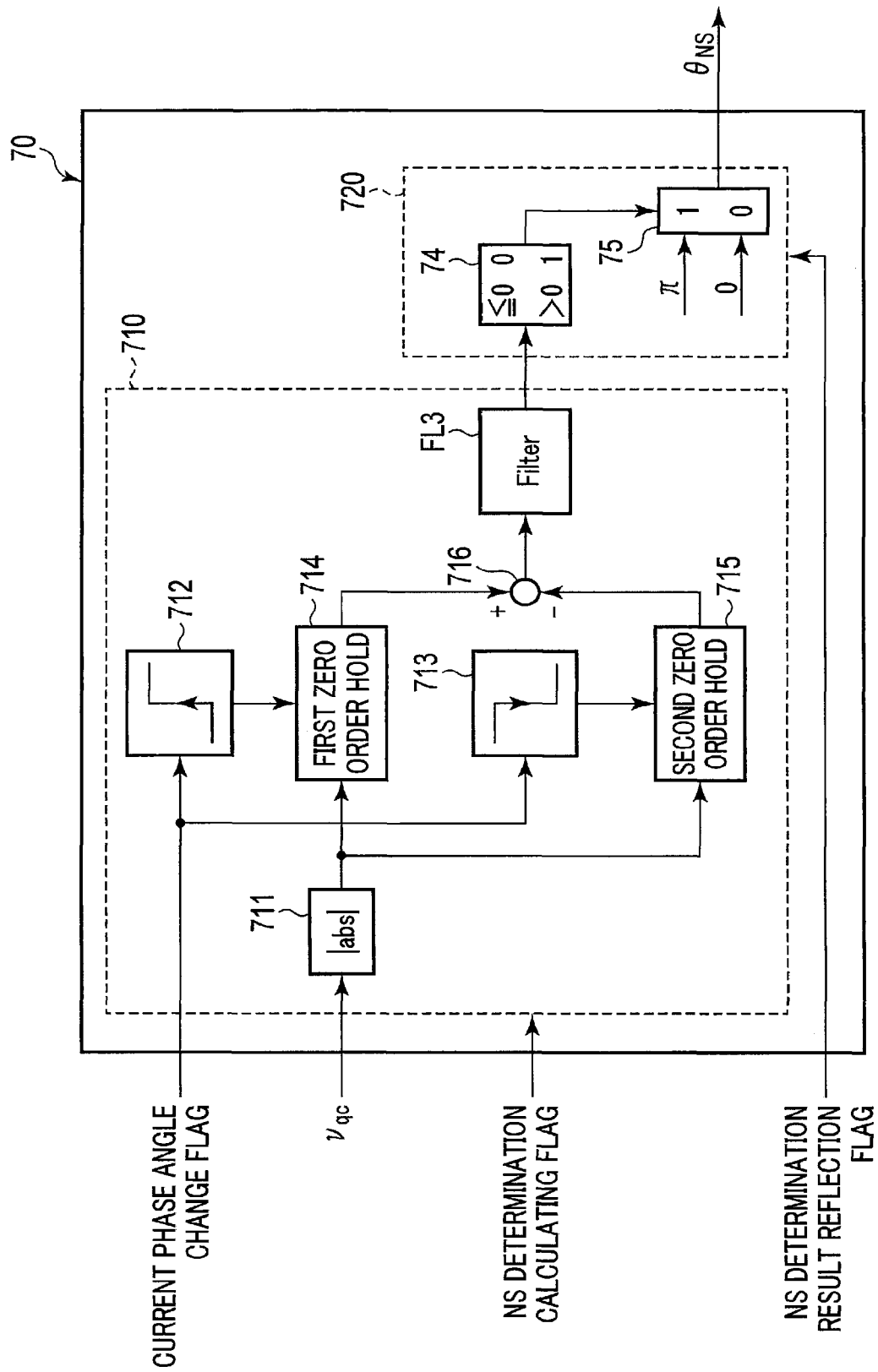
FIG. 15 is a block diagram schematically showing another configuration example of a polarity determination part of the inverter control device of the fourth embodiment.

FIG. 15 is a block diagram schematically showing another configuration example of a polarity determination part of the inverter control device of the fourth embodiment.

The polarity determination part 70 includes a q-axis voltage difference calculator 710 and a correction value calculator 720. The q-axis voltage difference calculator 710 includes an absolute value calculator 711, trigger output parts 712, 713, a first zero order hold 714, a second zero order hold 715, a subtractor 716, and a filter FL3. The correction value calculator 720 includes selectors 74, 75.

The absolute value calculator 711 calculates an absolute value of a q-axis voltage actual value Vqc, and supplies a calculation result to the first zero order hold 714 and the second zero order hold 715.

The trigger output part 712 outputs a pulse to the first zero order hold 714 in synchronism with timing at which a current phase angle change flag is set to "ON".

Upon receiving a pulse from the trigger output part 712, the first zero order hold 714 holds a value supplied from the absolute value calculator 711 as an output value, and outputs the output value to the subtractor 716.

The trigger output part 713 outputs a pulse to the second zero order hold 715 in synchronism with timing at which the current phase angle change flag is set to "OFF".

Upon receiving a pulse from the trigger output part 713, the second zero order hold 715 holds a value supplied from the absolute value calculator 711 as an output value, and outputs the output value to the subtractor 716.

The subtractor 716 subtracts the value supplied from the second zero order hold 715 from the value supplied from the first zero order hold 714, and supplies a value obtained by the subtraction to the filter FL3. That is, the subtractor 716 outputs a q-axis voltage difference which is obtained by subtracting a q-axis voltage generated when a d-axis current command value changes from positive to negative from a q-axis voltage generated when the d-axis current command value changes from negative to positive.

The filter FL3 is a low pass filter, for example, and outputs a q-axis voltage difference from which a high frequency component is removed to the selector 74.

The selector 74 determines whether or not the q-axis voltage difference outputted from the filter FL3 is equal to or below zero, and outputs a value corresponding to a determination result. That is, the selector 74 sets an output value to "0" when the q-axis voltage difference is zero or less, and sets the output value to "1" when the q-axis voltage difference is larger than zero.

The selector 75 outputs a correction value $\theta NS$ based on a value outputted from the selector 74. That is, the selector 75 outputs $\pi$ (180°) as the correction value $\theta NS$ when the value outputted from the selector 74 is "1", and outputs 0° as the correction value $\theta NS$ when the value outputted from the selector 74 is "0".

The correction value $\theta NS$ outputted from the selector 75 is added to a rotary phase angle estimated value $\theta est'$ outputted from the rotary phase angle estimator 60 so that the rotary phase angle estimated value $\theta est'$ is corrected. The corrected rotary phase angle estimated value $\theta est$ is supplied to the dq/αβ converter 20 and the αβ/dq converter 62 and is used for vector conversion.

Figure 16:
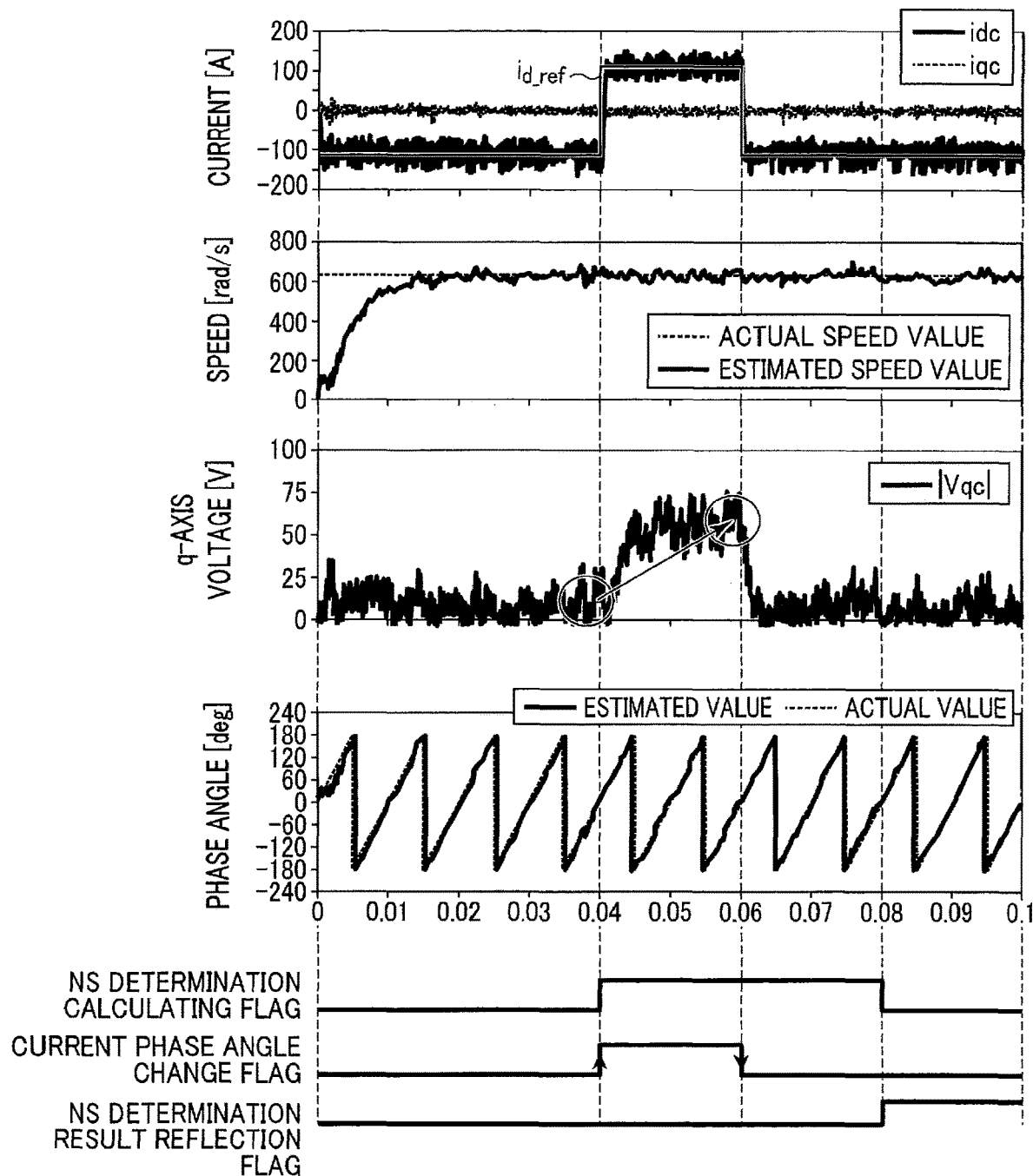
FIG. 16 is a view showing an example of a simulation result of a polarity determination operation performed by the inverter control device of the embodiment.

FIG. 16 and FIG. 17 are views showing an example of a simulation result of a polarity determination operation performed by the inverter control device of the embodiment. In FIG. 16 and FIG. 17, a simulation result during a period including a period from timing at which the current conducting flag Ion shown in FIG. 8 is set to "ON" to timing at which an NS determination calculation flag is set to "OFF" is shown.

FIG. 16 and FIG. 17 describe an example where the supply of a current starts and the calculation of estimated values of a rotary phase angle and a rotational speed starts at 0 sec, and the initial estimation is completed at 0.1 sec. Further, the calculation of polarity determination is started at a point of time of 0.04 sec.

FIG. 16 shows a simulation result when an actual value and an estimated value of a rotary phase angle are not displaced from each other.

In starting polarity determination, the host controller CTR changes a d-axis current command id_ref from negative to positive and, at the same time, sets an NS determination calculation flag and a current phase angle change flag to "ON". When the current phase angle change flag is set to "ON", an absolute value of a q-axis voltage Vqc is held in the first zero order hold 714 as an output value. When a d-axis current command id_ref changes from negative to positive, an absolute value of a q-axis voltage Vqc is increased.

Next, the host controller CTR changes the d-axis current command id_ref from positive to negative and, at the same time, sets the current phase angle change flag to "OFF". When the current phase angle change flag is set to "OFF", an absolute value of the q-axis voltage Vqc is held as an output value by the second zero order hold 715. When the d-axis current command id_ref changes from positive to negative, an absolute value of the q-axis voltage Vqc is decreased.

Then, the host controller CTR sets an NS determination result reflection flag to "ON", and outputs a correction value $\theta NS$ from the polarity determination part 70. In this manner, polarity determination is finished.

In this example, an output value of the first zero order hold 714 becomes smaller than an output value of the second zero order hold 715, and a value outputted from the filter FL3 becomes zero or below. Accordingly, the correction value $\theta NS$ becomes 0°.

FIG. 17 shows a simulation result when an actual value and an estimated value of a rotary phase angle are displaced from each other by 180°.

An operation of the host controller CTR is substantially equal to the operation of the host controller CTR in the simulation shown in FIG. 16. That is, in starting polarity determination, the host controller CTR changes a d-axis current command id_ref from negative to positive and, at the same time, sets an NS determination calculation flag and a current phase angle change flag to "ON". When the current phase angle change flag is set to "ON", an absolute value of a q-axis voltage Vqc is held in the first zero order hold 714 as an output value. In this example, when a d-axis current command id_ref changes from negative to positive, an absolute value of a q-axis voltage Vqc is decreased.

Next, the host controller CTR changes the d-axis current command id_ref from positive to negative and, at the same time, sets the current phase angle change flag to "OFF". When the current phase angle change flag is set to "OFF", an absolute value of the q-axis voltage Vqc is held as an output value by the second zero order hold 715. In this example, when the d-axis current command id_ref changes from positive to negative, an absolute value of the q-axis voltage Vqc is increased.

Then, the host controller CTR sets an NS determination result reflection flag to "ON", and outputs a correction value θNS from the polarity determination part 70. In this manner, polarity determination is finished.

In this example, an output value of the first zero order hold 714 becomes larger than an output value of the second zero order hold 715, and a value outputted from the filter FL3 becomes larger than zero and hence, the correction value θNS becomes 180°. Accordingly, an estimated value of a rotary phase angle is inverted by the correction value θNS and hence, an actual value and an estimated value of the rotary phase angle become equal to each other.

As described above, according to the inverter control device 1 and the drive system of this embodiment, in the same manner as the previously mentioned first embodiment, also in driving a synchronous motor having a small load magnetic flux, the magnetic pole position can be determined with high accuracy. Further, in the inverter control device 1 and the drive system according to this embodiment, unlike a method of determining a magnetic pole position by making use of a harmonic voltage, polarity determination can be performed with high accuracy even when a rotational speed is increased and hence, there is no possibility that noise occurs.

Further, according to the inverter control device 1 and the drive system of this embodiment, an inductance set value is not used in polarity determination and hence, it is possible to make the inverter control device 1 and the drive system robust against an error in setting a parameter. Further, an estimated speech value and a current value are not used in polarity determination and hence, it is possible to make the inverter control device 1 and the drive system insensible to a change in speed or a current ripple.

That is, according to the inverter control device 1 and the drive system of this embodiment, accuracy of a rotary sensorless control of an electric motor can be enhanced.

Next, an inverter control device 1 and a drive system of a fifth embodiment are described with reference to drawings.

Figure 18:
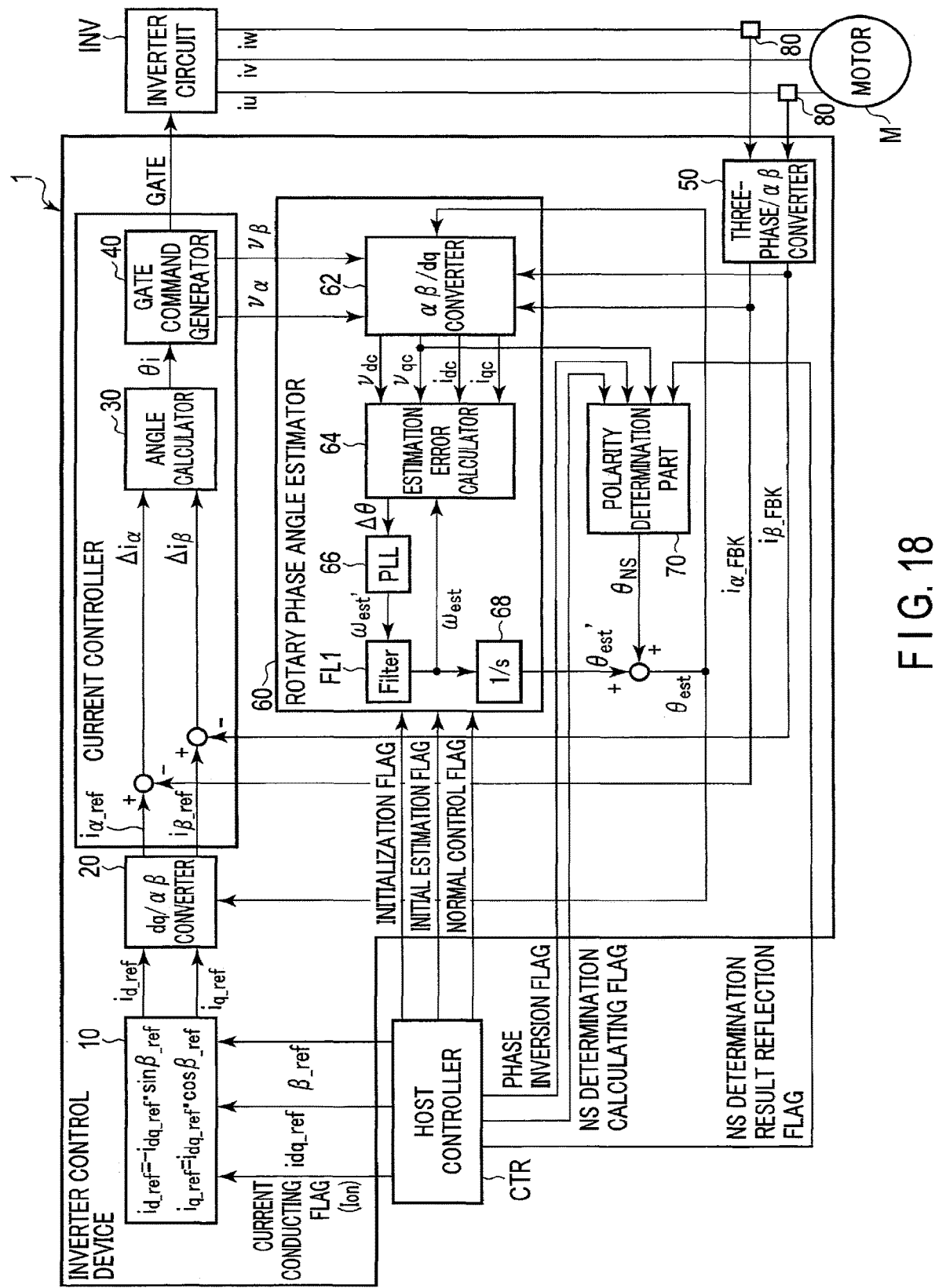
FIG. 18 is a block diagram schematically showing a configuration example of an inverter control device and a drive system of a fifth embodiment.

FIG. 18 is a block diagram schematically showing a configuration example of the inverter control device and the drive system of the fifth embodiment. In the inverter control device 1 and the drive system of this embodiment, polarities are determined based on a q-axis voltage generated when a d-axis current in a positive direction flows and a q-axis voltage generated when a d-axis current in a negative direction flows. That is, the polarity determination part 70 performs magnet magnetic pole determination of the electric motor based on a comparison result between a q-axis voltage value of the electric motor when 0° is added to a rotary phase angle estimated value and a q-axis voltage value of the electric motor when 180° is added to the rotary phase angle estimated value, and outputs a correction value for the rotary phase angle estimated value based on a determination result.

The inverter control device 1 of this embodiment differs from the inverter control device 1 of the above-mentioned first to fourth embodiments with respect to a flag supplied to the polarity determination part 70 and the configuration of the polarity determination part 70. That is, in this embodiment, a host controller CTR supplies a phase inversion flag to the polarity determination part 70. The host controller CTR switches the phase inversion flag from High (H) to Low (L) when polarity determination is started, and switches the phase inversion flag from Low (L) to High (H) after a lapse of a predetermined time.

Figure 19:
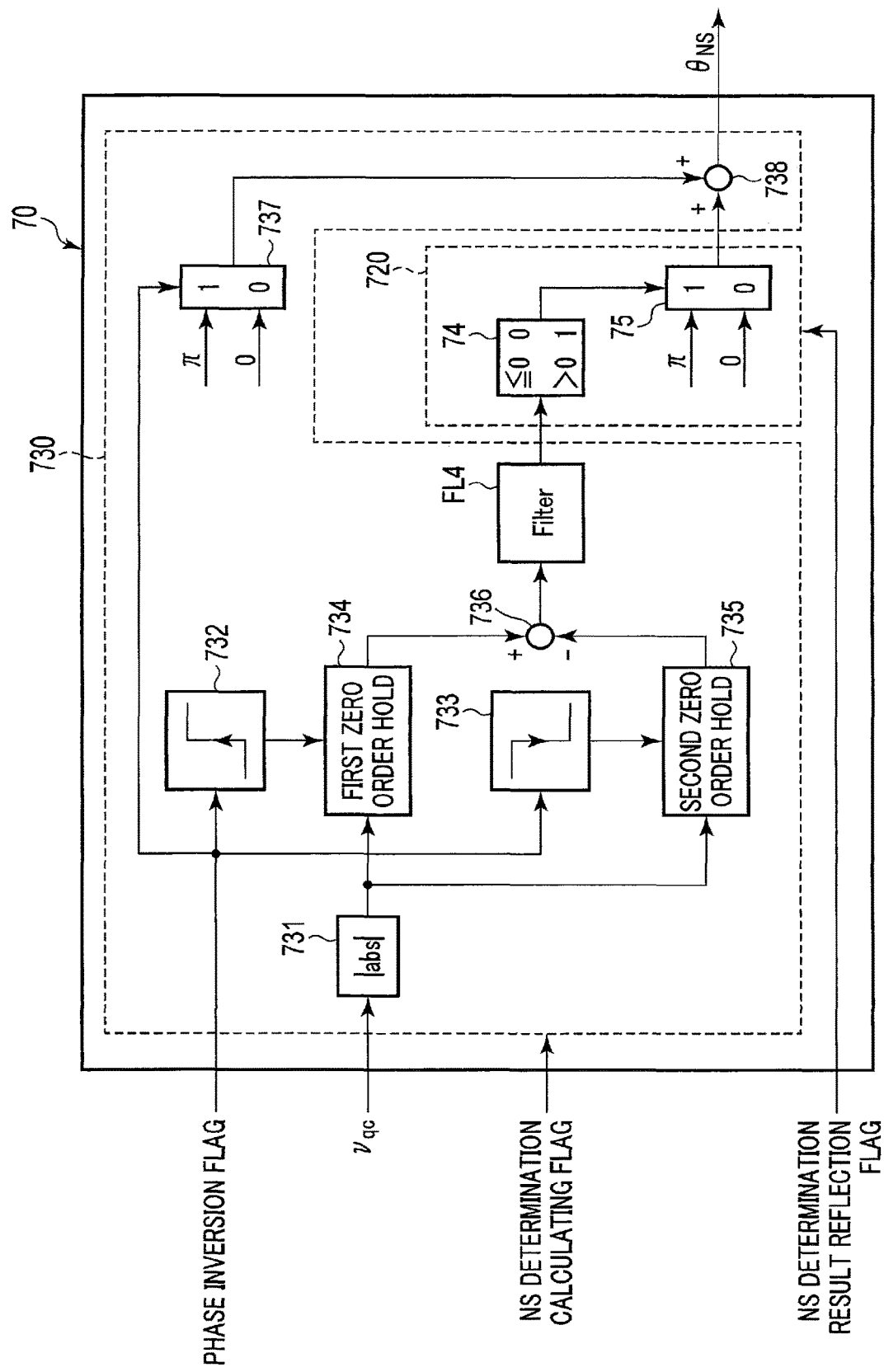
FIG. 19 is a block diagram schematically showing another configuration example of a polarity determination part of the inverter control device of the fifth embodiment.

FIG. 19 is a block diagram schematically showing another configuration example of a polarity determination part of the inverter control device of the fifth embodiment.

The polarity determination part 70 includes a phase inverting part 730 and a correction value calculator 720. The phase inverting part 730 includes an absolute value calculator 731, trigger output parts 732, 733, a first zero order hold 734, a second zero order hold 735, a subtractor 736, a selector 737, an adder 738, and a filter FL4. The correction value calculator 720 includes selectors 74, 75.

The absolute value calculator 731 calculates an absolute value of a q-axis voltage actual value Vqc, and supplies a calculation result to the first zero order hold 734 and the second zero order hold 735.

The trigger output part 732 outputs a pulse to the first zero order hold 734 in synchronism with timing at which a phase inversion flag is set to "ON".

Upon receiving a pulse from the trigger output part 732, the first zero order hold 734 holds a value supplied from the absolute value calculator 731 as an output value, and outputs the output value to the subtractor 736.

The trigger output part 733 outputs a pulse to the second zero order hold 735 in synchronism with timing at which a phase inversion flag is set to "OFF".

Upon receiving a pulse from the trigger output part 733, the second zero order hold 735 holds a value supplied from the absolute value calculator 731 as an output value, and supplies the output value to the subtractor 736.

The subtractor 736 subtracts the value supplied from the second zero order hold 735 from the value supplied from the first zero order hold 734, and supplies a value obtained by the subtraction to the filter FL4.

The selector 737 receives a phase inversion flag. The selector 737 outputs $\pi$ (=180°) as an output value when the phase inversion flag is "1", and outputs zero (=0°) as an output value when the phase inversion flag is "0". The value outputted from the selector 737 is supplied to the adder 738.

The filter FL4 is a low pass filter, for example, and outputs a q-axis voltage difference from which a high frequency component is removed to the selector 74.

The selector 74 determines whether or not the q-axis voltage difference outputted from the filter FL4 is equal to or below zero, and outputs a value corresponding to a determination result. That is, the selector 74 sets an output value to "0" when the q-axis voltage difference is zero or less, and sets the output value to "1" when the q-axis voltage difference is larger than zero.

The selector 75 selects an output value based on a value outputted from the selector 74. That is, the selector 75 outputs $\pi$ (180°) as the output value when the value outputted from the selector 74 is "1", and outputs 0° as the output value when the value outputted from the selector 74 is "0". The value outputted from the selector 75 is supplied to the adder 738.

The adder 738 outputs a correction value θNS by adding the value outputted from the selector 737 and the value outputted from the selector 75. The correction value θNS outputted from the adder 738 is added to a rotary phase angle estimated value θest outputted from the rotary phase angle estimator 60 so that the rotary phase angle estimated value θest is corrected. The corrected rotary phase angle estimated value θest is supplied to the dq/αβ converter 20 and the αβ/dq converter 62 and is used for vector conversion.

FIG. 20 and FIG. 21 are views showing an example of a simulation result of a polarity determination operation performed by the inverter control device and the drive system of the embodiment. In FIG. 20 and FIG. 21, a simulation result during a period including a period from timing at which the current conducting flag Ion shown in FIG. 8 is set to "ON" to timing at which an NS determination calculation flag is set to "OFF".

FIG. 20 and FIG. 21 describe an example where the supply of a current starts and calculation of estimated values of a rotary phase angle and a rotational speed is started at 0 sec, and initial estimation is completed at 0.1 sec. Further, calculation of magnetic pole determination is started at a point of time of 0.04 sec. In the simulation described hereinafter, a d-axis current command is set to a negative fixed value.

FIG. 20 shows a simulation result when an actual value and an estimated value of a rotary phase angle are not displaced from each other.

In starting polarity determination, the host controller CTR sets an NS determination calculation flag and a phase inversion flag to "ON". When the phase inversion flag is set to "ON", an absolute value of a q-axis voltage Vqc is held in the first zero order hold 734 as an output value. When the phase inversion flag is set to "ON", an output value of the selector 737 becomes 180°, and the correction value θNS becomes 180° so that an estimated value of a rotary phase angle is inverted. Accordingly, an absolute value of a q-axis voltage is increased.

Next, the host controller CTR sets the phase inversion flag to "OFF" at a point of time of 0.06 sec. When the phase inversion flag is set to "OFF", an absolute value of a q-axis voltage Vqc is held by the second zero order hold 735 as an output value. Further, when the phase inversion flag is set to "OFF", an output value of the selector 737 becomes 0°, and a correction value θNS becomes 0°. Accordingly, an estimated value of a rotary phase angle matches an actual value.

Then, the host controller CTR sets an NS determination result reflection flag to "ON", and outputs a correction value θNS from the polarity determination part 70. In this manner, polarity determination is finished.

In this example, an output value of the first zero order hold 734 becomes smaller than an output value of the second zero order hold 735, and a value outputted from the filter FL4 becomes zero or below. Accordingly, the output value of the selector 75 becomes 0°. At this point of time, a phase inversion flag is "0" so that the output value of the selector 75 is a correction value θNS. That is, the output value of the selector 75 is 0°. Accordingly, a state where an estimated value and an actual value of a rotary phase angle are equal is maintained.

FIG. 21 shows a simulation result where an actual value and an estimated value of a rotary phase angle are displaced from each other by 180°.

An operation of the host controller CTR is substantially equal to the operation of the host controller CTR in the simulation shown in FIG. 20. That is, in starting polarity determination, the host controller CTR sets an NS determination calculation flag and a phase inversion flag to "ON". When the phase inversion flag is set to "ON", an absolute value of a q-axis voltage Vqc is held in the first zero order hold 734 as an output value. Further, when the phase inversion flag is set to "ON", an output value of the selector 737 becomes 180°, and a correction value θNS becomes 180°. Accordingly, an estimated value of a rotary phase angle matches an actual value.

Next, the host controller CTR sets the phase inversion flag to "OFF" at a point of time of 0.06 sec. When the phase inversion flag is set to "OFF", an absolute value of a q-axis voltage Vqc is held by the second zero order hold 735 as an output value. Further, when the phase inversion flag is set to "OFF", an output value of the selector 737 becomes 0°, and a correction value θNS becomes 0°. Accordingly, an estimated value and an actual value of a rotary phase angle are displaced from each other by 180°.

Then, the host controller CTR sets an NS determination result reflection flag to "ON", and outputs a correction value θNS from the polarity determination part 70. In this manner, polarity determination is finished.

In this example, an output value of the first zero order hold 734 becomes larger than an output value of the second zero order hold 735, and a value outputted from the filter FL4 becomes larger than zero. Accordingly, the output value of the selector 75 becomes 180°. At this point of time, a phase inversion flag is "0" so that the output value of the selector 75 is a correction value θNS. That is, the output value of the selector 75 is 180°. Accordingly, an estimated value of a rotary phase angle is inverted by the correction value θNS and hence, an actual value and an estimated value of the rotary phase angle become equal to each other.

As described above, according to the inverter control device 1 and the drive system of this embodiment, in the same manner as the previously mentioned first embodiment, also in driving a synchronous motor having a small load magnetic flux, the magnetic pole position can be determined with high accuracy. Further, in the inverter control device 1 and the drive system according to this embodiment, unlike a method of determining a magnetic pole position by making use of a harmonic voltage, polarity determination can be performed with high accuracy even when a rotational speed is increased and hence, there is no possibility that noise occurs.

Further, according to the inverter control device 1 and the drive system of this embodiment, an inductance set value is not used in polarity determination and hence, it is possible to make the inverter control device 1 and the drive system robust against an error in setting a parameter. Further, an estimated speed value and a current value are not used in polarity determination and hence, it is possible to make the inverter control device 1 and the drive system insensible to a change in speed or a current ripple.

That is, according to the inverter control device 1 and the drive system of this embodiment, accuracy of a rotary sensorless control of an electric motor can be enhanced.

In the first to third embodiments, polarity determination is performed by calculating a differential by subtracting a set value from an actual value. However, the actual value may be subtracted from the set value. In this case, conditions necessary for performing the correction of a rotary phase may be reversed. Further, a factor used for polarity determination is not limited to a magnetic flux or a voltage provided that the factor is a characteristic amount generated due to a difference in a d-axis magnetic flux.

In the first to fifth embodiments, the description has been made by taking the method where a current control is performed in accordance with a current tracking type PWM control as an example. However, other methods may be adopted provided that these methods form a unit which can determine an inverter gate command by which a current command and a current detection value are made to match. For example, substantially the same advantageous effects can be obtained even when a triangular wave comparison type PWM modulation method which uses a PI control is adopted, for example.

In the above-mentioned first to fifth embodiments, the description has been made by taking a sensorless control where a rotary phase angle and a rotational speed are estimated as an example. However, substantially the same advantageous effects can be obtained by adopting a magnet-type synchronous motor drive system which uses a sensor where magnet polarities are not known or a speed sensor such as a pulse generator (PG), for example, in the present invention.

The first to fifth embodiments are provided on a premise that a voltage is generated to some extent. However, when a rotational speed is low, a rotary sensorless control method may be changed in a normal control after initial estimation, and magnet magnetic polarity may be determined again by a method which uses a harmonic current, a method which uses a magnet induced voltage or the like.

Hereinafter, a method which performs NS determination based on harmonic current information, and a method which performs NS determination based on an induced voltage generated by magnet rotation are described.

1) Method which Uses Harmonic Current

Compare to the voltage equation [Formula 1] when an estimated rotary phase angle matches a true rotary phase angle, in the case where the estimated rotary phase angle and the true rotary phase angle do not match, a dq-axis voltage equation is modified to the following [Formula 16].

[Mathematical 10]

$$\begin{bmatrix} v_{dc} \\ v_{qc} \end{bmatrix} = \begin{bmatrix} R - \omega_e L_{dqc} & -\omega_e L_{qc} \\ \omega_e L_{dc} & R + \omega_e L_{dqc} \end{bmatrix} \begin{bmatrix} i_{dc} \\ i_{qc} \end{bmatrix} +$$
$$p \begin{bmatrix} L_{dc} & L_{dqc} \\ L_{dqc} & L_{qc} \end{bmatrix} \begin{bmatrix} i_{dc} \\ i_{qc} \end{bmatrix} + \psi \omega_e \begin{bmatrix} -\sin\theta \\ \cos\theta \end{bmatrix}$$ [Formula 16]

[Formula 17] is obtained by modifying [Formula 16] with respect to a current differential term.

[Mathematical 11]

$$p \begin{bmatrix} i_{dc} \\ i_{qc} \end{bmatrix} = \frac{1}{L_d L_q} \begin{bmatrix} L_0 - L_1 \cos 2\Delta\theta & -L_1 \sin 2\Delta\theta \\ -L_1 \sin 2\Delta\theta & L_0 + L_1 \cos 2\Delta\theta \end{bmatrix}$$
$$\left\{ \begin{bmatrix} v_{dc} \\ v_{qc} \end{bmatrix} - \begin{bmatrix} R & -\omega_e L_0 \\ \omega_e L_0 & R \end{bmatrix} \begin{bmatrix} i_{dc} \\ i_{qc} \end{bmatrix} - \begin{bmatrix} -\omega_e L_1 \sin 2\Delta\theta & \omega_e L_1 \cos 2\Delta\theta \\ \omega_e L_1 \cos 2\Delta\theta & \omega_e L_1 \sin 2\Delta\theta \end{bmatrix} \begin{bmatrix} i_{dc} \\ i_{qc} \end{bmatrix} \psi \omega_e \begin{bmatrix} -\sin\Delta\theta \\ \cos\Delta\theta \end{bmatrix} \right\}$$ [Formula 17]

Where, $L_0 = \frac{(L_d + L_q)}{2}$ $L_1 = \frac{(L_d - L_q)}{2}$

In this method, the case where a motor rotational speed is sufficiently low so that a voltage drop due to a resistance can be ignored is taken as an example. In this case, [Formula 17] is modified to the following [Formula 18].

[Mathematical 12]

$$p \begin{bmatrix} i_{dc} \\ i_{qc} \end{bmatrix} = \frac{1}{L_d L_q} \begin{bmatrix} L_0 - L_1 \cos 2\Delta\theta & -L_1 \sin 2\Delta\theta \\ -L_1 \sin 2\Delta\theta & L_0 + L_1 \cos 2\Delta\theta \end{bmatrix} \begin{bmatrix} v_{dc} \\ v_{qc} \end{bmatrix}$$ [Formula 18]

When a high frequency voltage is applied only to an estimated d-axis (dc-axis), [Formula 18] is modified to [Formula 19].

[Mathematical 13]

$$p \begin{bmatrix} i_{dc} \\ i_{qc} \end{bmatrix} = \frac{1}{L_d L_q} \begin{bmatrix} L_q \\ \frac{-L_d + L_q}{2} \cdot 2\Delta\theta \end{bmatrix} v_{dh}$$ [Formula 19]

According to the above-mentioned [Formula 19], a harmonic current on a qc-axis changes depending on a rotation angle $\Delta\theta$, and a rotary phase angle can be estimated by making use of this characteristic of rotation angle dependency. However, this characteristic changes twice as large as a rotor rotation angle and hence, the characteristic cannot be used in determining a phase difference of 180° such as NS.

On the other hand, the NS determination method which makes use of an understanding that a dc-axis harmonic current is decided in accordance with the inverse number of d-axis inductance is also adopted. Inductance of a magnet-type synchronous motor having magnetic saliency exhibits a characteristic shown in FIG. 6 where inductance is increased when a +d-axis current is supplied in a positive direction. As an opposite case, inductance is lowered when a −d-axis current is supplied. That is, in determining polarity of a magnetic pole, a harmonic voltage is applied in a d-axis direction while supplying a ±d-axis current, and the magnetic pole is determined based on magnitude of the harmonic current when such a harmonic voltage is applied.

2) Method which Uses Magnet Induced Voltage

Then, a polarity determination method which uses an induced voltage generated by magnet rotation is described.

When a permanent magnet-type synchronous motor is rotated in a non-load state, [Formula 16] is modified to [Formula 20].

[Mathematical 14]

$$\begin{bmatrix} v_{dc} \\ v_{qc} \end{bmatrix} = \psi \omega_e \begin{bmatrix} -\sin\theta \\ \cos\theta \end{bmatrix} \quad \text{[Formula 20]}$$

Further, a voltage when an N pole of a magnet matches a d-axis (θ=0°) and a voltage when NS are inverted (θ=180°) are expressed by [Formula 21].

[Mathematical 15]

$$v_{qc} = \psi \omega_e \cos(0°) = +\psi \omega_e$$

$$v_{qc} = \psi \omega_e \cos(-180°) = -\psi \omega_e \quad \text{[Formula 21]}$$

As expressed by [Formula 21], when a magnetic pole position is inverted, a symbol of an induced voltage generated on a qc-axis is inverted. A voltage is generated in a +q-axis direction in ideal and hence, NS determination can be performed by looking at a symbol of vqc.

While several embodiments of the present invention have been described, these embodiments have been presented by way of example only, and are not intended to limit the scope of the invention. The novel embodiments described herein may be embodied in a variety of other forms. Furthermore, various omissions, substitutions and changes in the form of the embodiments described herein may be made without departing from the spirit of the invention. The accompanying claims and their equivalents are intended to cover such forms or modifications as would fall within the scope and spirit of the present invention.

In the above-mentioned plurality of embodiments, the inverter control device and the host controller may have the configurations realized by hardware. Alternatively, the inverter control device and the host controller may include at least a processor and a memory, and may realize the configurations of the inverter control device and the drive system by software. Both cases can acquire substantially the same advantageous effect as the above-mentioned plurality of embodiments.

The invention claimed is:

1. An inverter control device comprising:
   a current command generator that generates a current command value;
   a current detector that detects a current value of an alternating current to be outputted from an inverter circuit to an electric motor;
   a gate command generator that generates a gate command to the inverter circuit such that the current command value and the current value detected by the current detector match, and obtains an output voltage target vector of the inverter circuit based on the gate command;
   a rotary phase angle estimator that obtains a rotary phase angle estimated value of the electric motor based on the current value detected by the current detector and the output voltage target vector; and
   a polarity determination part that, with supply of a current in synchronism with a rotor frequency of the electric motor, performs determination of a magnet magnetic pole of the electric motor using a generated magnetic flux or voltage in synchronism with the generated rotor frequency or both of the magnetic flux and the voltage, and outputs a correction value for the rotary phase angle estimated value based on a result of the determination.

2. The inverter control device according to claim 1, wherein the polarity determination part performs the determination of the magnet magnetic pole of the electric motor based on difference between an actual value of the magnetic flux and a set value of the magnetic flux or based on difference between an actual value of the voltage or a set value of the voltage.

3. The inverter control device according to claim 2, wherein the polarity determination part obtains a set value of the magnetic flux or a set value of the voltage using an inductance set value set within a range between an inductance value when a d-axis current in a positive direction is supplied to the electric motor and an inductance value when a d-axis current in a negative direction is supplied to the electric motor.

4. A drive system having magnetic saliency comprising:
   the inverter control device according to claim 2;
   a host controller that controls an operation of the inverter control device;
   the inverter circuit; and
   the electric motor, wherein
   the electric motor includes a rotor formed of a magnet or a rotor in which a magnet is embedded.

5. The inverter control device according to claim 1, wherein the polarity determination part performs the determination of the magnet magnetic pole of the electric motor based on a comparison result between a q-axis voltage value of the electric motor obtained by adding 0° to the rotary phase angle estimated value and a q-axis voltage value of the electric motor obtained by adding 180° to the rotary phase angle estimated value.

6. A drive system having magnetic saliency comprising:
   the inverter control device according to claim 5;
   a host controller that controls an operation of the inverter control device;
   the inverter circuit; and
   the electric motor, wherein
   the electric motor includes a rotor formed of a magnet or a rotor in which a magnet is embedded.

7. The inverter control device according to claim 1, wherein the polarity determination part performs the determination of the magnet magnetic pole of the electric motor based on a comparison result between a q-axis voltage value of the electric motor when a current is supplied aiming at a −d-axis direction and a q-axis voltage value of the electric motor when the current is supplied aiming at a +d-axis direction.

8. A drive system having magnetic saliency comprising:
   the inverter control device according to claim 7;
   a host controller that controls an operation of the inverter control device;
   the inverter circuit; and
   the electric motor, wherein
   the electric motor includes a rotor formed of a magnet or a rotor in which a magnet is embedded.

9. The inverter control device according to claim 1, wherein calculation of a rotary phase angle estimated value by the rotary phase angle estimator and the determination of the magnet magnetic pole by the polarity determination part are performed in response to an activation command of the inverter circuit.

10. A drive system having magnetic saliency comprising:
    the inverter control device according to claim 9;
    a host controller that controls an operation of the inverter control device;
    the inverter circuit; and the electric motor, wherein
the electric motor includes a rotor formed of a magnet or a rotor in which a magnet is embedded.

11. A drive system having magnetic saliency comprising:
the inverter control device according to claim 1;
a host controller that controls an operation of the inverter control device;
the inverter circuit; and
the electric motor, wherein
the electric motor includes a rotor formed of a magnet or a rotor in which a magnet is embedded.

* * * * *